(12) United States Patent
Suzuki et al.

(10) Patent No.: US 6,178,158 B1
(45) Date of Patent: Jan. 23, 2001

(54) METHOD AND APPARATUS FOR TRANSMISSION AND RECEPTION

(75) Inventors: Yasunori Suzuki, Yokohama; Ken Kumagai, Sendai; Toshio Nojima, Yokosuka, all of (JP)

(73) Assignee: Nippon Telegraph & Telephone Corporation, Tokyo (JP)

( * ) Notice: Under 35 U.S.C. 154(b), the term of this patent shall be extended for 0 days.

(21) Appl. No.: 08/948,090

(22) Filed: Oct. 9, 1997

(30) Foreign Application Priority Data

Oct. 14, 1996 (JP) .................................................. 8-271063

(51) Int. Cl.[7] .................... H04J 3/06; H04J 3/00
(52) U.S. Cl. .................. 370/203; 370/205; 370/208; 370/209
(58) Field of Search .................... 370/203, 205, 370/206, 208, 209, 210, 320, 352, 335

(56) References Cited

U.S. PATENT DOCUMENTS 5,371,548   12/1994   Williams .

FOREIGN PATENT DOCUMENTS 0 719 001 A1   6/1996   (EP) ................................ H04L/5/06

WO 96 24995   8/1996   (EP) .

OTHER PUBLICATIONS

Byrnes, J.S., "Quadrature Mirror Filters, Low Crest Factor Arrays, Functions Achieving Optimal Uncertainty Principle Bounds, and Complete Orthonornal Sequences—A Unified Approach," Applied and Computational Harmonic Analysis, 1, pp. 261–266 (1994).

Wang, S–S, "LMS Algorithm and Discrete Orthogonal Transforms," ND Systems, vol. 38, No. 8, Aug. 1991, pp. 949–951.

*Primary Examiner*—Chi H. Pham
*Assistant Examiner*—Brenda H. Pham
(74) *Attorney, Agent, or Firm*—Pollock, Vande Sande & Amernick, RLLP

(57) ABSTRACT

In a method for transmission and reception over N transmission channels, the transmitting side performs orthonormal transform processing of N-channel modulated signals so that the resulting transformed output signals have lower cross-correlation, and the transformed N-channel signals are multiplexed and transmitted over the N-channels. At the receiving side, the N-channel received signals are subjected to inverse orthonormal transform processing to obtain N-channel modulated signals, which are demodulated to obtain a digital signal.

21 Claims, 22 Drawing Sheets

METHOD AND APPARATUS FOR TRANSMISSION AND RECEPTION

BACKGROUND OF THE INVENTION

The present invention relates to a method and apparatus for transmission and reception which simultaneously permit highly sophisticated channel and extremely suppressed peak power caused by multiplexing of plural modulated signals.

In future telecommunications, to provide advanced multimedia services of offering video, audio, or database contents is expected. In transmission techniques for telecommunications improvement of channel quality and improvement of transmission speed are indepensable to establish such services.

With a view to enhancing the channel quality, there have been proposed a method of increasing the signal energy on the channel, a method of utilizing channel coding, and a method of using diversity reception.

To improve of transmission speed, it is possible to use a method of speeding up the code transmission rate and a method of utilizing high efficiency modulation.

As transmission techniques that satisfies the both requirements of enhancement of the channel quality and the transmission speed, there are available several methods, and from the viewpoint of circuit technology, parallel transmission technique using an error correcting scheme is effective. The usefulness of the error correcting scheme decreases required Eb/NO (the energy per bit-to-noise spectral density ratio), making it possible to economize devices used and increase the channel capacity. The reduction of the code transmission speed per single carrier through the parallel transmission scheme could be implemented by present circuit technology.

The error correcting scheme is, for example, an ARQ (Automatic Repeat reQuest) or FEC (Forward Error Correction) scheme. The parallel transmission scheme is, for example, a multicarrier transmission, CDMA (Code Division Multiple Access), or OFDM (Orthogonal Frequency Division Multiplex) scheme.

The parallel transmission means employing the error correcting scheme has such problems as mentioned below. First, the usefulness of the error correcting scheme causes by increasing the signal bandwidth on the channel or decreasing the channel throughput, constituting an obstacle to effective usefulness of the channel. Second, multiplexing of plural modulated signals causes by increasing the peak power of the combined signal. To settle the first and second problems, studies are being made of them individually.

The first problem is being actively studied in terms of error correcting scheme, and the second problem in terms of a peak power reducing scheme. To reduce the peak power, there have been proposed so far a method of adjusting the initial phase of carrier (Shouichi Narahashi and Toshio Nojima, "Initial Phase Setting Method for Reducing Peak to Average Power Ratio (PAPR) of a Multitone Signal," IECEJ Proc. B-II, No. 11, pp. 663–671, November 1995), a method of searching for combinations of possible signals and taking some measures (Japanese Pat. Appln. Laid-Open No. 504175/94, "Method for Reducing Peak to Average Power Ratio in QAM Communication System"), a method of detecting the peak power and multiplexing signals in a manner to reduce the peak (Shigeru Tomisato, Hiroshi Suzuki, "Envelope Smoothing Parallel Modulation-Demodulation System," IECEJ Technical Bulletin RCS95-77, September 1995), and a method that a signal corresponding to an error correcting symbol is newly sent as a channel for suppressing the peak power (Wilkinson T. A. and Jones A. E., "Minimization of the peak to mean envelope power ratio of multicarrier transmission scheme by block coding," Proc. IEEEE VTS pp. 825–829, 1995). These conventional schemes have, however, defects that the number of carriers for parallel transmission is large and that they cannot be applied to an arbitrary input signal.

SUMMARY OF THE INVENTION

It is therefore an object of the present invention to provide a method and apparatus for transmission and reception which permit reduction of the peak power of a combined signal without depending on statistical properties of the input signal and without increasing the number of channels for parallel transmission.

Another object of the present invention is to provide a method and apparatus for transmission and reception which realizes enhancement of the quality of the channel for parallel transmission.

According to a first aspect of the present invention, the transmission apparatus comprises: modulation means for modulating each of N-channel parallel digital signals, N being an arbitrary integer equal to or greater than 2; and orthonormal transform means for subjecting N-channel modulated signals from the modulation means to orthonormal transform processing to generate N-channel transformed signals of lower cross-correlation.

According to a second aspect of the present invention, the reception apparatus comprises: inverse orthonormal transform means supplied with N-channel signals from N transmission channels, for subjecting the received N-channel signals to transform processing inverse to the orthonormal transform processing to generate modulated signals of the corresponding N channels; and demodulation means for demodulating the N-channel modulated signals output from the inverse orthonormal transform means to generate N-channel digital signals.

According to a third aspect of the present invention, the method for transmission and reception comprises the steps of:

(a) subjecting N-channel modulated signals to orthonormal transform processing at the transmitting side to generate N-channel transformed signals of lower cross-correlation and transmitting them over N transmission channels;

(b) receiving the N-channel transmitted signals at the receiving side and subjecting them to transform processing inverse to the orthonormal transform processing to obtain N-channel modulated signals; and (c) demodulating the N-channel modulated signals into N-channel digital signals.

DESCRIPTION OF THE PREFERRED EMBODIMENTS

Figure 1:
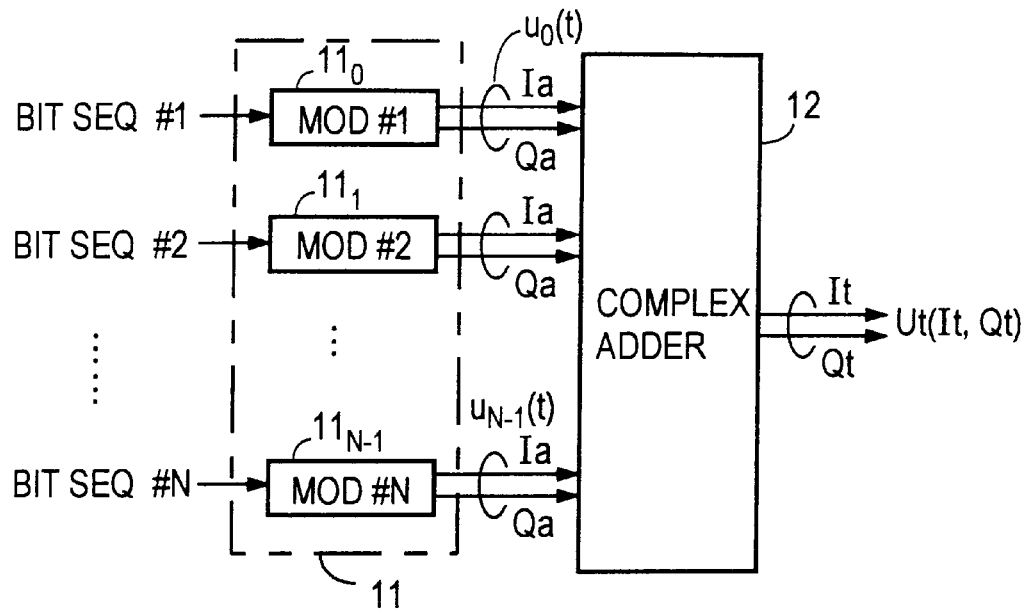
FIG. 1 is a block diagram of a conventional transmitting apparatus of the type that multiplexes N-channel QPSK signals.

To explain the principles of the present invention according to its first aspect, there is shown in FIG. 1 the basic configuration of a conventional transmitting apparatus. In this example, an input signal of each channel is a bit string, which is shown to be QPSK-modulated by a modulator $11_i$ into a complex base-band signal v(Ia,Qa). N-channel input signals are modulated by N modulators $11_0$ to $11_{N-1}$ forming a modulating part 11, respectively, into modulated signals $U_i$(Ia,Qa) of i-th channels, and these N-channel modulated signals are combined by a complex adder part 12 into a complex combined signal $U_f$(It,Qt). In this instance, the N-channel input signals may be independent signals or signals obtained by converting a serial signal into parallel form.

Figure 2:
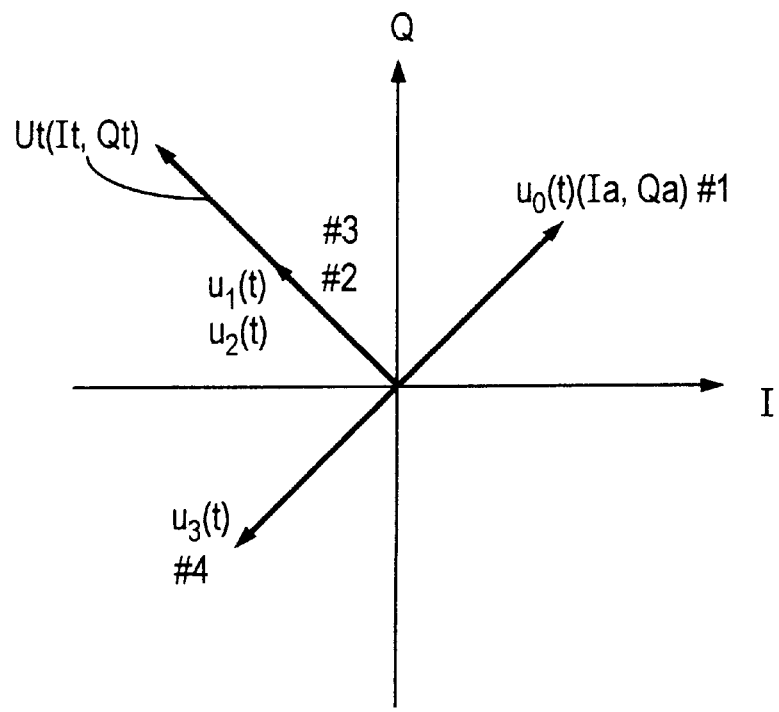
FIG. 2 is a diagram showing output signals from respective modulators and a combined signal in a complex plane when setting N=4.
Figure 3:
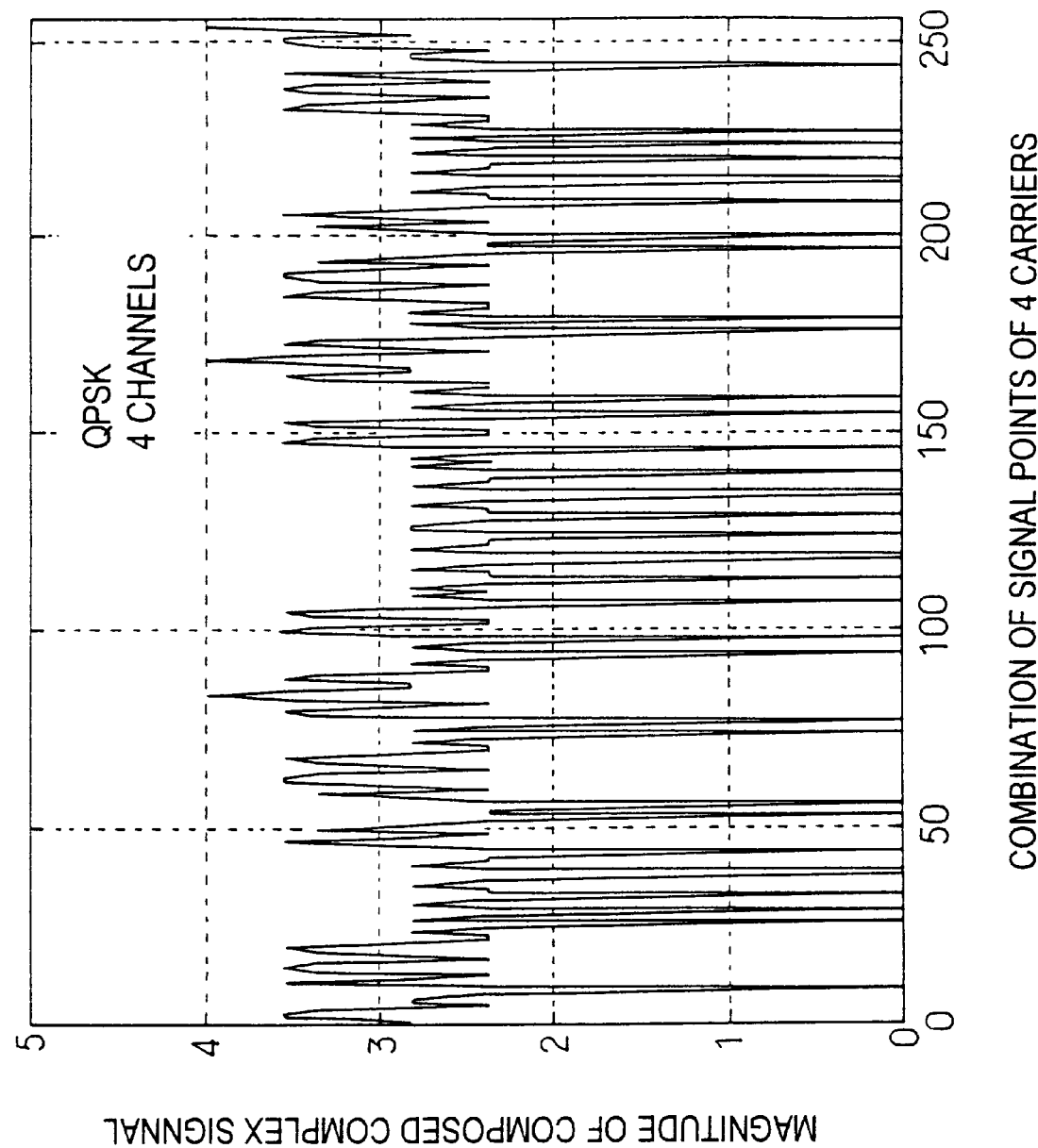
FIG. 3 is a graph showing the magnitude of a complex combined signal of 4-channel QPSK signals.

In FIG. 2, there are shown in a complex plane the modulated signals output from the modulators $11_0$ to $11_{N-1}$ when the number of channels N=4, i.e. The complex base-band signals (Ia,Qa) in this case and the complex combined signal $U_f$(It,Qt) output from the complex adder part 12. The modulated signals each have a phase $\pi/4$, $3\pi/4$, $5\pi/4$, or $7\pi/4$ and all have the same amplitude, but the amplitude value of the complex combined signal $U_f$(It,Qt) differs with combinations of complex base-band signals output from the modulators and, theoretically, it is in the range between 4 to 0. FIG. 3 shows the amplitude value of the complex combined signal by every combination of the complex base band signals output from the modulators when N=4. Form FIG. 3, it will be seen that the maximum and minimum amplitude values of the complex combined signal are 4 and zero.

Figure 4:
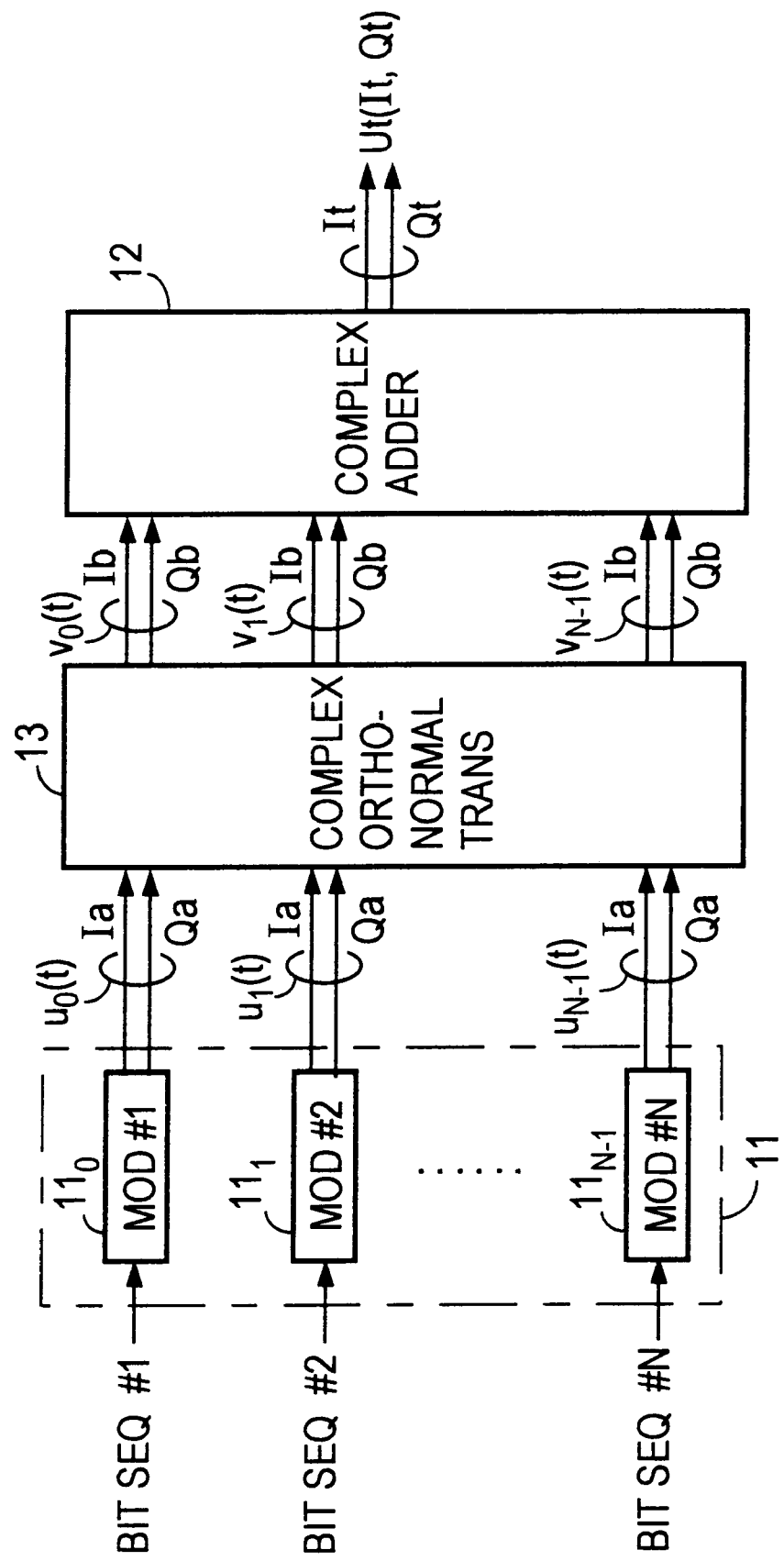
FIG. 4 is a block diagram of a transmitting apparatus that performs QPSK modulation by a modulator 11.

FIG. 4 shows in block form a complex signal combining apparatus corresponding to the apparatus of FIG. 1 so as to explain the fundamental principles of the present invention according to its first aspect. As is the case with FIG. 1, there are provided a modulating part 11 composed of N modulators $11_0$ to $11_{N-1}$ for modulating N-channel input signals and a complex adder part 12 for complex-combining N-channel modulated signals, i.e. complex base-band signals in this example. This example differs from the prior art example of FIG. 1 in that a complex orthonormal transform part 13 is interposed between the modulators $11_0$ to $11_{N-1}$. The complex orthonormal transform part 13 inputs there into N-channel modulated signals $u_0(t)$ to $u_{N-1}(t)$ and outputs them so that the cross-correlation between the N-channel transformed outputs $v_0(t)$ to $v_{N-1}(t)$ is lower. This is intended to decrease the peak power of the complex combined signal that is output from the complex adder part 12.

Figure 5A:
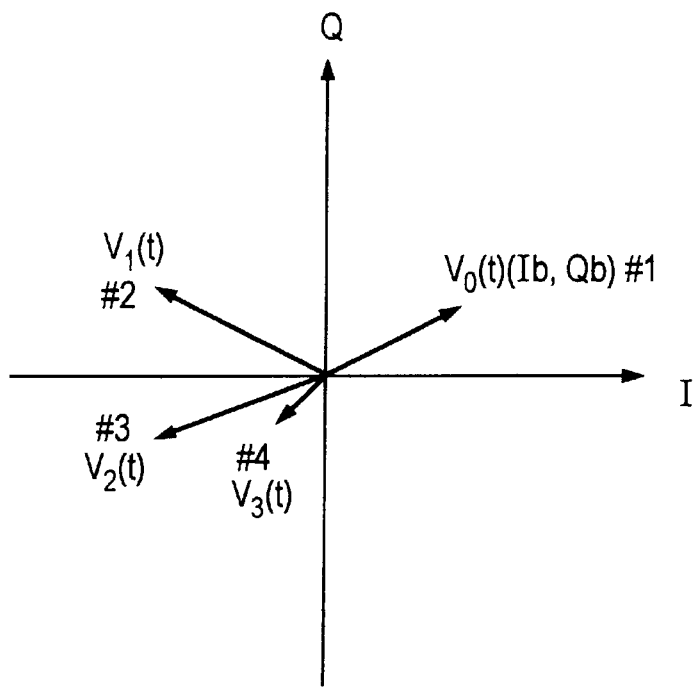
FIG. 5A is a diagram showing, in a complex plane, output signals from a complex orthonormal transform part 13 in FIG. 4.
Figure 5B:
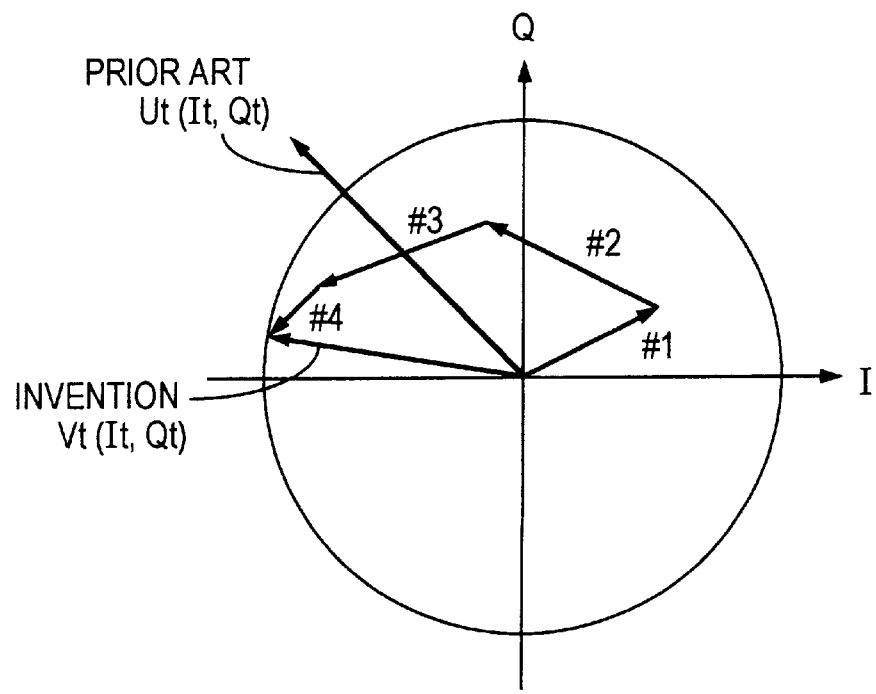
FIG. 5B is a diagram showing, in the complex plane, a combined signal obtained by combining the complex orthonormal transform output signals of FIG. 4 by a complex adder part 12.

FIG. 5A shows, in a complex plane, a transformed signal $v_i$(Ib,Qb) that is output from the complex orthonormal transform part 13 when N=4 in FIG. 4. When the modulated signal is subjected to complex orthonormal transform processing, the amplitude of the transformed signal does not always take a constant value nor does its phase take a value (2n+1)π/4. Hence, the amplitude value of the transformed signal differs from the amplitude value of the complex base-band signal depicted in FIG. 2. The complex combined signal of such transformed signals is shown in FIG. 5B, which shows loci of the conventional complex combined signal U$_f$(It,Qt) depicted in FIGS. 1 and 2 and the complex combined signal Vt(It,Qt) based on the principles of the present invention. The peak power of the complex combined signal according to the present invention is smaller than that of according to the prior art.

Figure 6:
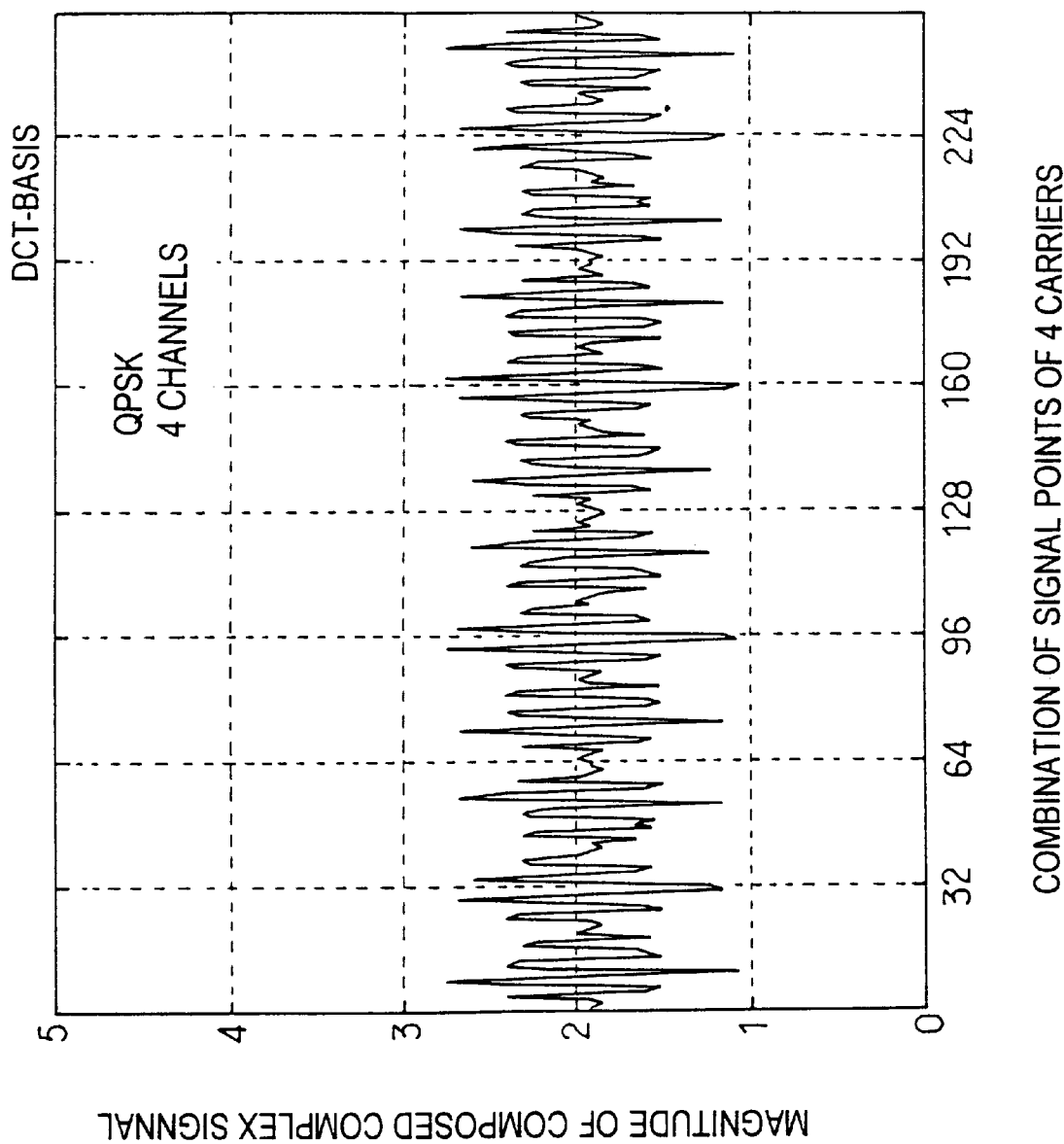
FIG. 6 is a graph showing the magnitude of a complex combined signal obtained by combining signals generated by subjecting 4-channel QPSK signals to orthonormal transform processing using a DCT base in the transmitting apparatus of FIG. 4.
Figure 7:
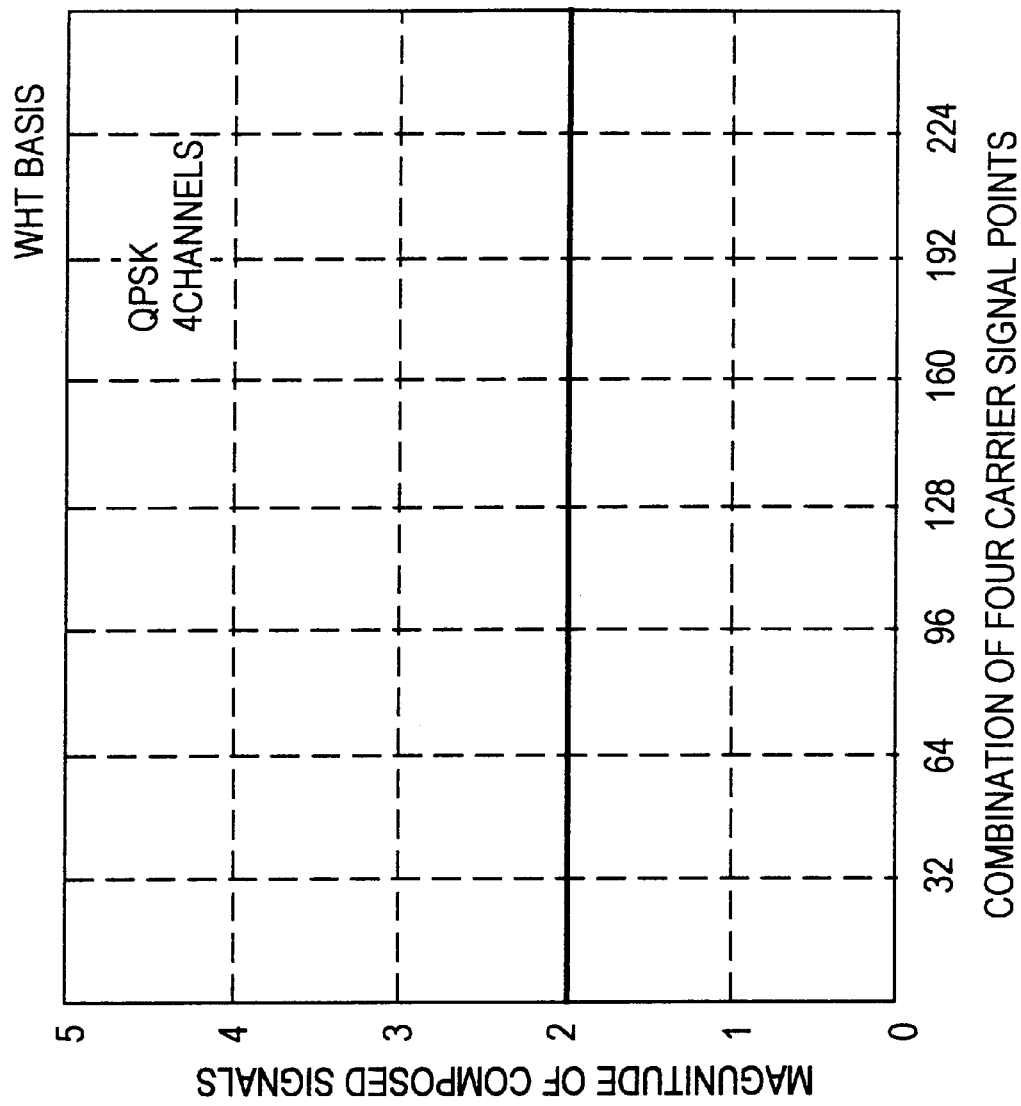
FIG. 7 is a graph showing the magnitude of a complex combined signal obtained by combining signals generated by subjecting 4-channel QPSK signals to orthonormal transform processing using a WHT base in the transmitting apparatus of FIG. 4.

In FIGS. 6 and 7, there are shown amplitude values of complex combined signals of all combinations of the complex base-band signals from the modulators when N=4, calculated using a WHT (Walsh-Hadamard Transform) base, and a DCT (discrete Cosine Transform) base that is an approximation of a KLT (Karhunen-Loeven transform) base, as the orthonormal base in the complex orthonormal transform part 13. FIG. 6 shows an example using the DCT base, and FIG. 7 shows an example using the WHT base. In the latter case, the amplitude value of the complex combined signal is 2.0. In the former case, the amplitude value of the complex combined signal varies from a minimum value of 1.0 to a maximum value of 3.0. As in the case of using the DCT base, the amplitude value of the complex combined signal may sometimes vary owing to the orthonormal base actually used. This is because the DCT base is an approximation of the KLT base.

With the signal processing scheme of the present invention, the peak power of the complex combined signal that results from multiplexing of plural modulated waves is equal to the sum of average powers of the respective modulated waves.

Figure 8:
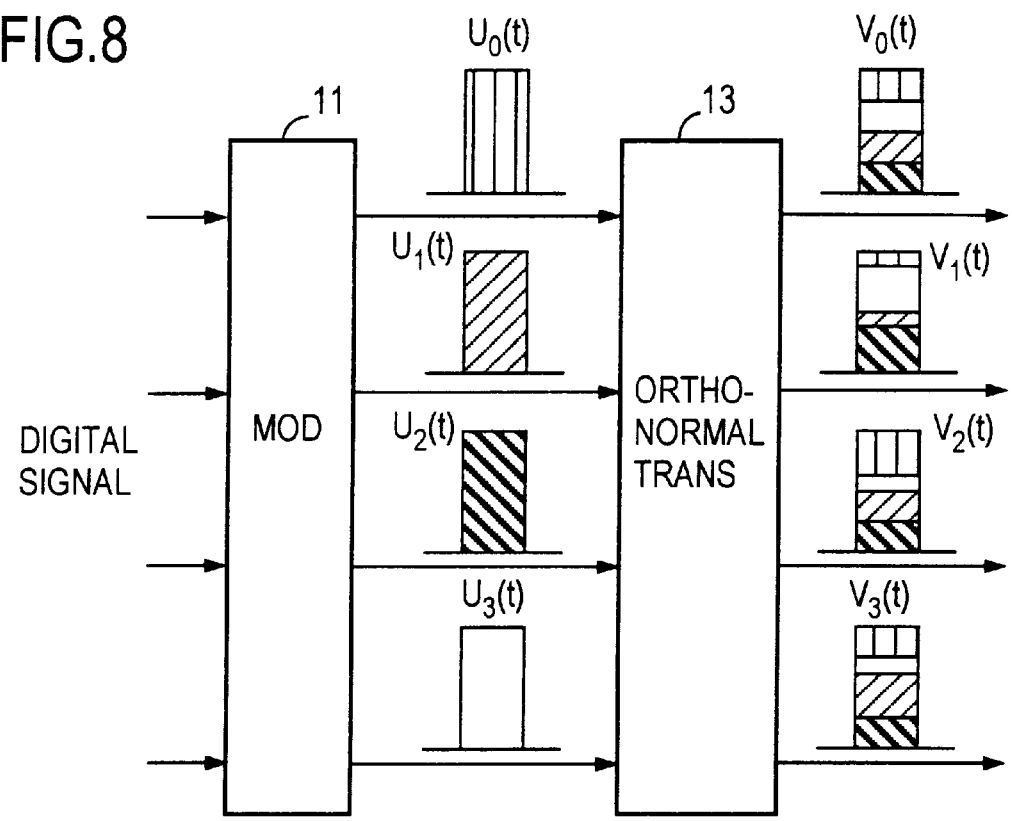
FIG. 8 is a diagram for explaining distributed transmission by a orthonormal transform part.

Next, a description will be given of the principle of an error correcting effect that is given by distributed transmission according to the second aspect of the present invention. FIG. 8 shows the principle of the distributed transmission according to the present invention, which is predicated on multicarrier transmission for convenience of explanation. Conventionally, independent information is transmitted for each channel, but according to the present invention, the N-channel modulated signals $u_0(t)$ to $u_{N-1}(t)$ output from the modulator 11 are orthonormal-transformed by the orthonormal transform part 13 into signals vi of the respective channels, on which the original N-channel modulated signals $u_0(t)$ to $u_{N-1}(t)$ are superimposed as schematically depicted in FIG. 8. In comparison with the conventional multicarrier transmission, even if a signal partly drops out in any one or more N-channel caused by fading, the transmission or send signal can be reconstructed to some extent by an inverse orthonormal transform part 22 through utilization of the signals of the other remaining transmission channels at the receiving side. The some effect by the disturbed transmission is equivalent to improvement of the transmission performance by using an ordinary error correcting code; therefore, the distributed transmission according to the present invention produces a kind of error correcting effect.

Now, a description will be given of a frequency diversity effect that is obtained as a result of the distributed transmission from the orthonormal transform part 13. Since the number of channels in which signals drop out caused by frequency selective fading can be reduced by greatly spacing out carrier frequencies of modulators of plural channels, the drop-out signal can be reconstructed or restored using the signals of the remaining channels as referred to previously. Thus, it is possible to prevent the transmission performance from deterioration by frequency selective fading channel.

While the above has been described qualitatively, it will be described quantitatively using mathematical expressions.

Figure 9A:
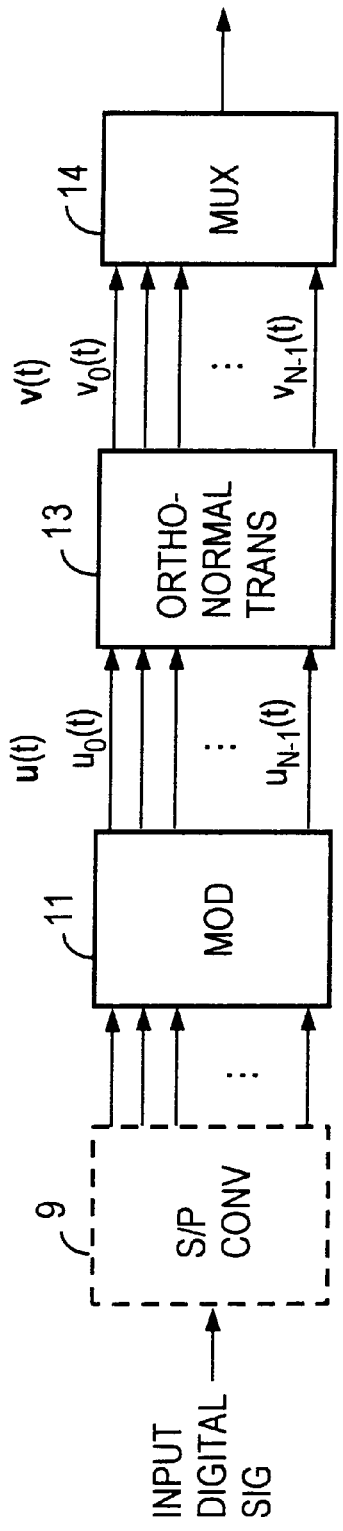
FIG. 9A is a block diagram illustrating an embodiment of the transmitting apparatus according to the present invention.

FIG. 9A shows block form an embodiment of the present invention applied to a transmitting apparatus 100, which employs one or more modulators 11. The numbers of input signals N to and output signals N from the orthonormal transform part 13 are the same as the number of modulated signals multiplexed. A mathematical representation of the operation of the orthonormal transform part 13 is a orthonormal transform matrix. In the present invention, an orthonormal transform part by the orthonormal transform base is used so as to keep constant the average power of the transmission signal before and after its orthonormal transform processing. Letting the vector of the input signal into the orthonormal transform part 13 at time t be represented by u(t), a complex base-band signal in an i-th transmission channel by $u_i(t)$ (where i=0,1, ..., N−1), an N×N orthonormal transform matrix by A, an element (i,j) of its complex number by $a_{ij}$, the vector of the orthonormal transform base by $a_i$, the vector of the output from the orthonormal transform part 13 by v(t), and a complex output signal in the i-th transmission channel by $v_i(t)$ and letting T represent a transposition, $$u(t)=[u_0(t)u_1(t) \ldots u_{N-1}(t)]^T \tag{1}$$

$$A = \begin{bmatrix} a_{0,0} & a_{0,1} & \cdots & a_{0,N-1} \\ a_{1,0} & a_{1,1} & \cdots & a_{1,N-1} \\ \vdots & \vdots & & \vdots \\ a_{i,0} & a_{i,1} & \cdots & a_{i,N-1} \\ \vdots & \vdots & & \vdots \\ a_{N-1,0} & a_{N-1,1} & \cdots & a_{N-1,N-1} \end{bmatrix} \tag{2}$$

$$a_i=(a_{i0}a_{i1} \ldots a_{iN-1}) \tag{3}$$

$$v(t)=[v_0(t)v_1(t) \ldots v_{N-1}(t)]^T \tag{4}$$

$$v(t)=Au(t). \tag{5}$$

The orthonormal transform matrix A of Eq. (2) has the following properties:

$$\sum_{n=0}^{N-1} a_{in}a_{jn}^* = \delta_{ij} \tag{6}$$

$$AA^H=A^HA=E \tag{7}$$

$$|v(t)|^2 = \sum_{n=0}^{N-1} \rho_n^2(t) \tag{8}$$

$$|u(t)|^2=|v(t)|^2 \tag{9}$$

where $\delta_{ij}$ is 1 when i=j and 0 when i≠j, H is a complex conjugate transposition, * is a complex conjugate, E is a unit matrix and $\rho^2_n(t)$ is a square of the absolute value of an n-th output signal $v_n(t)$ at time t. The input signal vector u(t) is transformed by the orthonormal transform matrix A into the output signal vector v(t). Based on Eq. (9), the signal power before and after the transform processing is preserved. Then, the input signal $U_n(t)$ is transformed by the orthonormal transform matrix so that the cross-correlation coefficient between input signals to a multiplexing part 14 is reduced.

Next, a description will be made of orthonomal of elements of the output signal vector by the complex orthonormal transform part 13 according to the present invention.

Letting a correlation matrix of the output signal vector v(t) be represented by $R_{vv}(t)$, $$R_{vv}(t)=v(t)v^H(t)=Au(t)u^H(t)A^H=AR_{uu}(t)A^H \quad (10)$$

where $R_{uu}(t)$ is a correlation matrix of the input signal vector u(t). In general, $R_{uu}(t)$ that is a real symmetric matrix of a non-negative definite value can be transformed by a proper orthonormal transform scheme into a diagonal matrix $R_{vv}(t)$ having positive elements as given by the following equation (11).

$$R_{vv}(t) = \begin{bmatrix} \rho_0^2(t) & 0 & \cdots & 0 \\ 0 & \rho_1^2(t) & \cdots & 0 \\ \vdots & & \cdots & \vdots \\ 0 & & \cdots & 0 \\ 0 & 0 & \cdots & \rho_{N-1}^2(t) \end{bmatrix} \quad (11)$$

By diminishing the cross-correlation matrix (11) between modulated signals that are multiplexed at certain point in time, the peak power of the multiplexed signal can be reduced. This will be described later on.

Figure 10A:
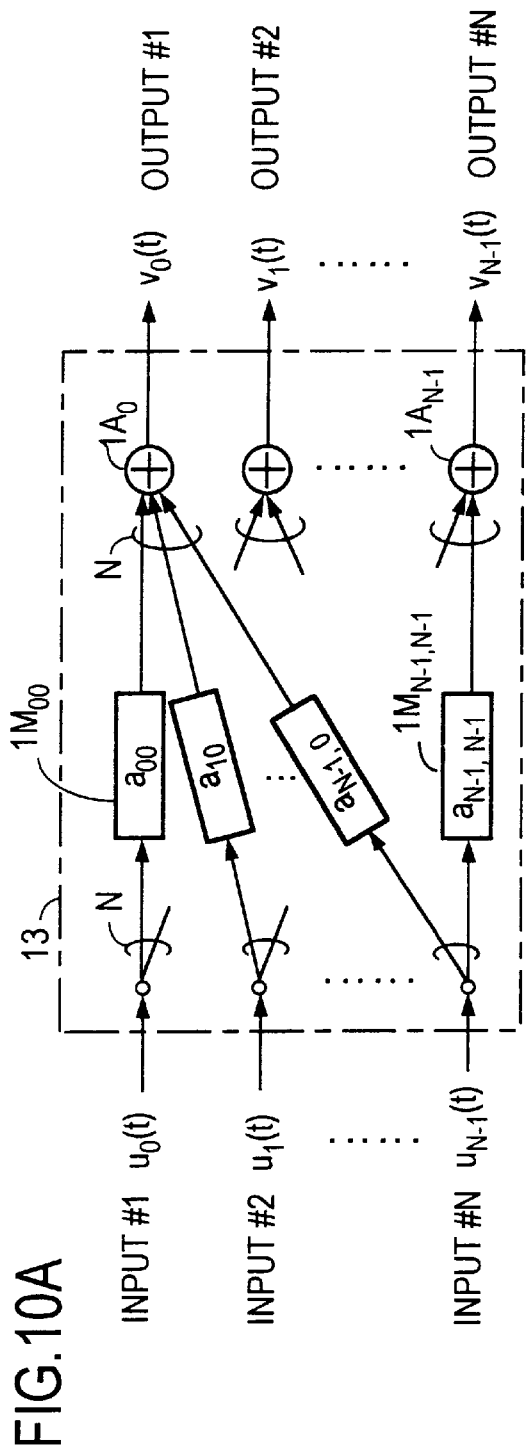
FIG. 10A is a block diagram illustrating the configuration of an orthonormal transform part 13 in FIG. 9A.

FIG. 10A shows the circuit configuration of the orthonormal transform part 13 that implements the N×N orthonormal transform matrix. As shown, the orthonormal transform part 13 comprises multipliers $1M_{i,j}$ (where i=0, 1, ... N−1 and j=0,1, ... , N−1) for multiplying coefficients $a_{ij}$ of the orthonormal base and adders $1A_0$, ... , $1A_{N-1}$. The adder $1A_i$ of the i-th channel adds together the input signals $u_0(t)$ to $u_{N-1}(t)$ weighted by coefficients $a_{1,0}, \ldots, a_{i,N-1}$ to obtain the output signal $v_i(t)$. The orthonormal transform processing is performed through a suitable selection of the coefficients $a_{0,0}, \ldots, a_{N-1,N-1}$ that are matrix elements. Such a numerical operation can be implemented by a computer. It is also possible to conduct the matrix calculation mathematically by a computer.

Figure 9B:
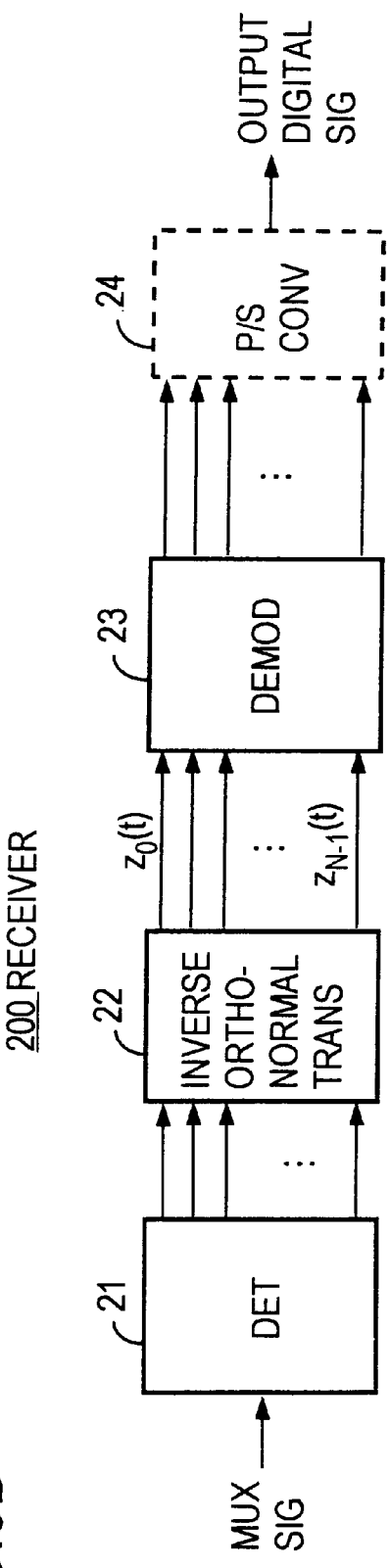
FIG. 9B is a block diagram illustrating an embodiment of the receiving apparatus according to the present invention.

The output signals vector v(t) from the orthonormal transform part 13 are multiplexed by a multiplexing part 14 into one carrier, which is sent to a receiving apparatus 200 of FIG. 9B over the channel. The thus transmitted multiplexed signal is usually added with noise on the channel. Letting the vector of the received signal band-limited by a low-pass filter be represented by y(t) and the noise vector on the channel by n(t), the vector y(t) of the received signal that is input into the receiving apparatus 200 is expressed by the following equation.

$$y(t)=v(t)+n(t)=Au(t)+n(t) \quad (12)$$

The receiving apparatus 200 comprises a detection part 21, an inverse orthonormal transform part 22 corresponding to the orthonormal transform part 13 in FIG. 9A and a demodulation part 23. The inverse orthonormal transform part 22 carries out the transformation expressed by an inverse matrix of Eq. (2). Letting the output signal vector of the inverse orthonormal transform part 22 by z(t) and its element by a complex number $z_n(t)$, $$z(t)=[Z_0(t)Z_1(t)Z_2(t) \ldots Z_{N-1}]^T \quad (13)$$

$$z(t)=A^H y(t)=A^H(Au(t)+n(t)=u(t)+A^H n(t) \quad (14)$$

The modulated signal vector u(t) can be derived by the inverse orthonormal transform part 22 from Eq. (14).

Figure 10B:
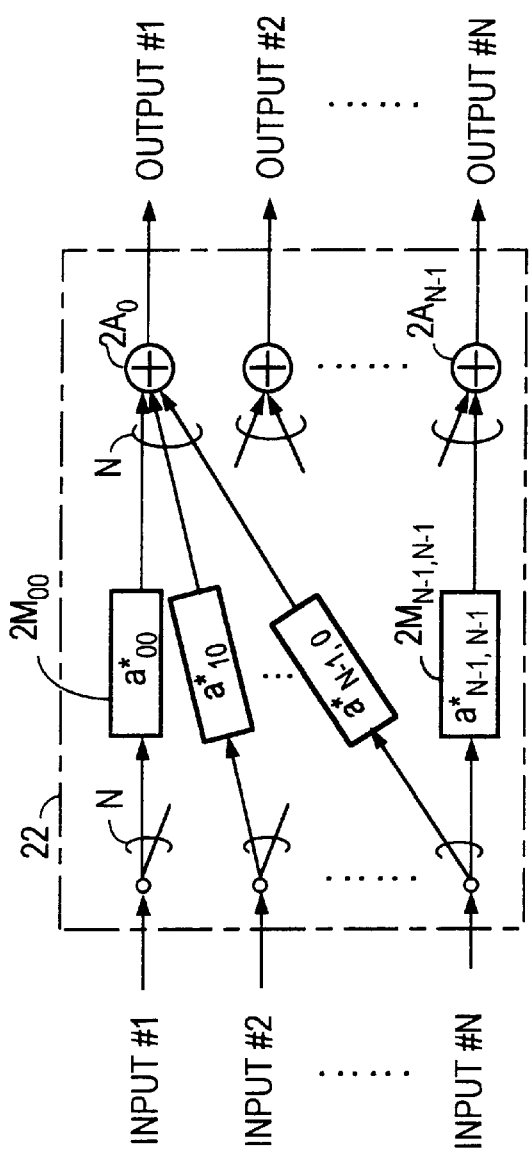
FIG. 10B is a block diagram illustrating the configuration of an inverse orthonormal transform part 22 in FIG. 9B.

FIG. 10B shows the circuit configuration of the inverse orthonormal transform part 22 that implements an N×N inverse orthonormal transform matrix. As shown, the inverse orthonormal transform part 22 comprises multipliers $2M_{i,j}$ (where i=0,1, ... , N−1 and j=0,1, ... , N−1) for multiplying coefficients $a_{ij}$ of the inverse orthonormal transform base and adders $2A_0$, ... , $2A_{N-1}$. The adder $2A_i$ of the i-th channel adds together the input signals $u_0(t)$ to $u_{N-1}(t)$ weighted by coefficients $a^*_{1,0}, \ldots, a^*_{i,N-1}$ to obtain the output signal $v_i(t)$. The coefficients $a^*_{i,j}$ is a complex conjugate of the coefficient $a_{i,j}$. The inverse orthonormal transform processing is performed through a suitable selection of the coefficients $a^*_{0,0}, \ldots, a^*_{N-1,N-1}$ that are matrix elements. Such a numerical operation can be implemented by a computer. It is also possible to conduct the matrix calculation mathematically by a computer.

The noise vector in Eq. (14) is transformed into a vector multiplied by the inverse matrix which is the inverse orthonormal transform part 22. The thus transformed noise vector is an inverse-orthonormal-transformed version of the vector n(t) as expressed below by Eq. (15).

$$\langle [A^H n(t)]^H A^H n(t) \rangle = \langle n^H(t) A A^H n(t) \rangle \quad (15)$$

$$= \langle n^H(t) n(t) \rangle = \sum_{n=0}^{N-1} \sigma_n^2$$

where <> is a time average and $\sigma_n^2$ is a variance of the noise vector of an n-th channel. The variance of the inverse-orthonormal-transformed noise vector of Eq. (15) is the same as the variance of the original noise vector at time t. Hence, no degradation of the transmission performance is caused by the inverse orthonormal transform means in an ideal static channel. The inverse-orthonormal-transformed received signal $z_i(t)$ of each channel is demodulated by the demodulation part 23 to obtain the transmitted digital signal.

In FIGS. 9A and 9B, the multiplexing part 14 and the detection part 22 may be omitted, in which case the modulated signal output from the orthonormal transform part 13 is sent intact, as a base-band signal, over the N-channel and received by the inverse orthonormal transform part 22.

Furthermore, as indicated by the broken lines in FIGS. 9A and 9B, there are cases where a serial-to-parallel converter 15 is connected to the input side of the modulation part 11 and where a parallel-to-serial converter 24 is connected to the output side of the demodulation part 23.

Figure 11A:
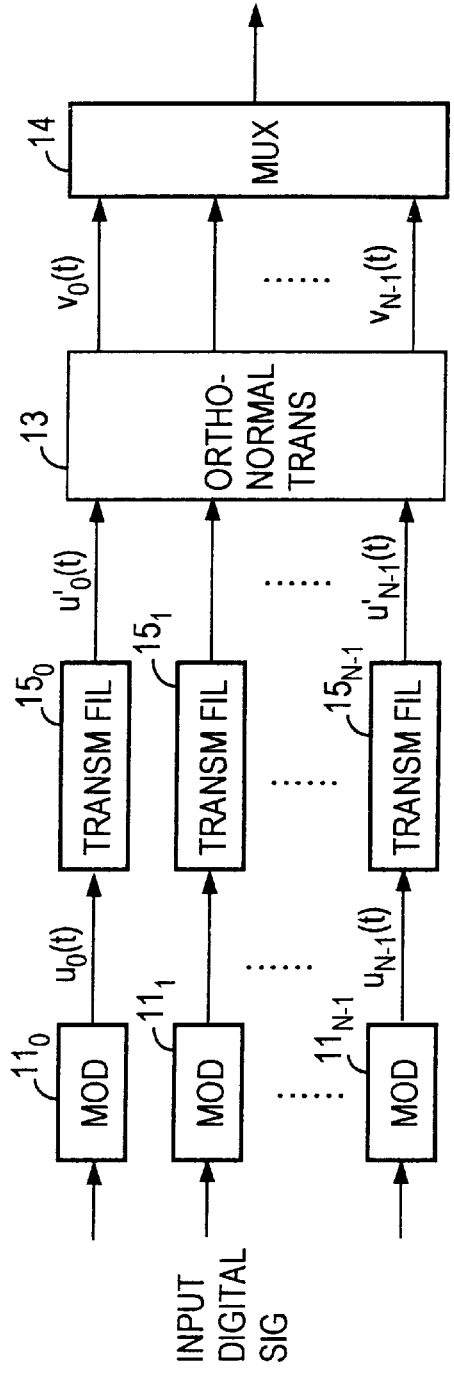
FIG. 11A is a block diagram of the transmitting apparatus of FIG. 9A which is provided with transmitting filters.

A description will be given of limitation of the transmission band in the case of using transmitting filters. FIG. 11A shows a configuration in which transmitting filters $15_0$ to $15_{N-1}$ for preventing inter-channel interference are connected to the outputs of the modulators $11_0$ to $11_{N-1}$ of the transmitting apparatus of FIG. 9A. Each transmitting filter $15_i$ is band-limited as predetermined. Now, let an M-order complex impulse response of the transmitting filter $15_i$ be represented by h and the input and output vectors of the transmitting filter 15i in the i-th channel from the current back to time M by $U_i(t)$ and $U'(t)$, respectively.

$$h=[h_0 h_1 h_2 \ldots h_{M-1}]^T \quad (16)$$

$$U_i(t)=[u_i(t)u_i(t-1)u_i(t-2) \ldots u_i(t-M+1)]^T \quad (17)$$

$$U'(t)=[u'_0(t)u'_1(t)u'_2(t) \ldots u'_{N-1}(tT \quad (18)$$

$$u'i(t)=h^H U_i(t) \quad (19)$$

Based on Eq. (19), the output vector $u'_i(t)$ of the transmitting filter $15_i$ is band-limited by its impulse response h.

The transmitting filter output vector $u'_i(t)$ of Eq. (19) is feed into the orthonormal transform part 13. The output vector v(t) of the orthonormal transform part 13 is as follows:

$$v(t)=AU'(t) \quad (20)$$

Noting the i-th channel, $$v_i(t) = \sum_{n=0}^{N-1} a_{in} u'_n(t) \quad (21)$$

The $u'_n(t)$ in Eq. (21) is band-limited by Eq. (19). The element $a_{in}$ of the orthonormal transform matrix A that is set in the orthonormal transform part 13 is a coefficient which does not frequency as a variable. Consequently, the band of the i-th channel output $v_i(t)$ from the orthonormal transform part 13, given by Eq. (21), is equal to a set $u'_n(t)$ (where n=0, ..., N−1) of all outputs from the transmitting filters 12$_0$ to 12$_{N-1}$. For this reason, the signal transformation by the orthonormal transform part 13 according to the present invention will not cause the defects of expansion and reduction of the transmission band.

Figure 11B:
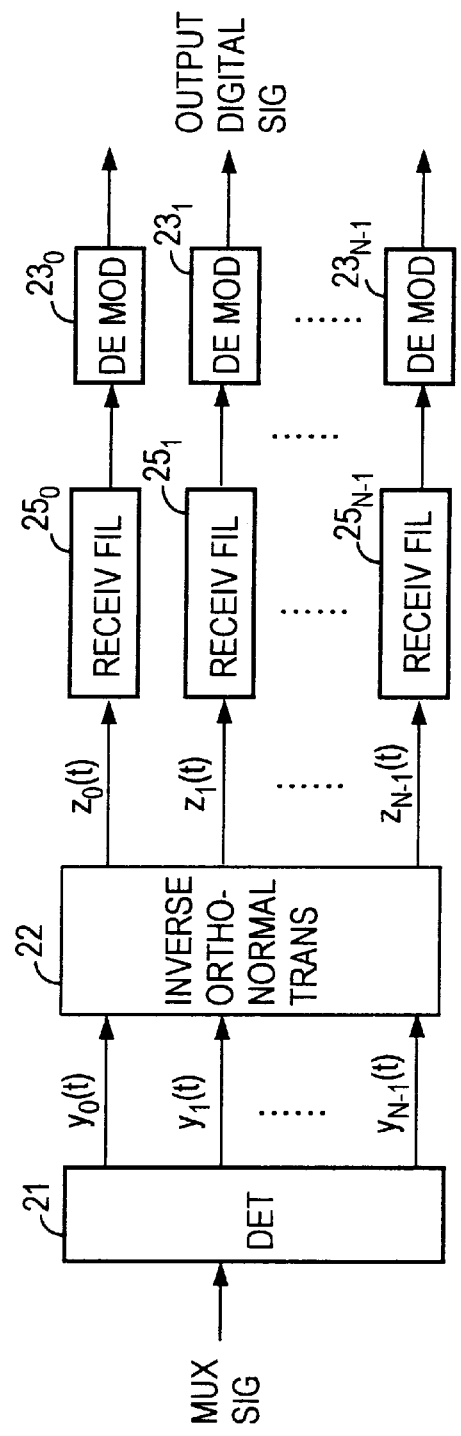
FIG. 11B is a block diagram of the receiving apparatus of FIG. 9B which is provided with receiving filters.

The receiving apparatus shown in FIG. 11B has, as in the case of FIG. 9B, the detection part 21, the inverse orthonormal transform part 22 and the demodulation part 23 (demodulators 23$_0$ to 23$_{N-1}$). In FIG. 11B, receiving filters 25$_0$ to 25$_{N-1}$ are interposed between the respective outputs of the inverse orthonormal transform part 22 and the demodulation part 23. The receiving filters 25$_0$ to 25$_{N-1}$ have the same complex impulse response characteristic as that of the transmitting filters 15$_0$ to 15$_{N-1}$ in FIG. 10A. The output vector z(t) of the inverse orthonormal transform part 22 is given by the following equation:

$$z(t)=[z_0(t)z_1(t)z_2(t) \ldots Z_{N-1}(t)]^T \quad (22)$$

The i-th channel output signal $z_i(t)$ from the inverse orthonormal transform part 22 is given as follows:

$$z(t)=A^H y(t)=u(t)+A^H n(t) \quad (23)$$

$$z_i(t) = \sum_{n=0}^{N-1} a^*_{in} y_n(t) \quad (24)$$

Letting the i-th channel receiving filter output be represented by $z'_i(t)$ and the i-th channel receiving filter input vector from the current back to time M by $Z_i(t)$, $$Z_i(t)=[z_i(t)z_i(t-1)z_i(t-2) \ldots z_i(t-M+1)]^T \quad (25)$$

$$z'_i(t)=h^H Z_i(t) \quad (26)$$

For Eq. (26), the receiving filter output signal $z'_i(t)$ is band-limited by the receiving filter impulse response h.

By connecting the transmitting filters to the input side of the orthonormal transform part 13 and receiving filters to the output side of the inverse orthonormal transform part 22 as described above, the transmitting filters and the receiving filters can be used as route roll-off filters.

The orthonormal transform matrix in the present invention needs only to satisfy Eqs. (5), (6), (7) and (9). On this account, plural orthonormal transform matrixes can be used. By hidden from this orthonormal transform matrix from other users, it is possible to provide increased security of communications.

Figure 12:
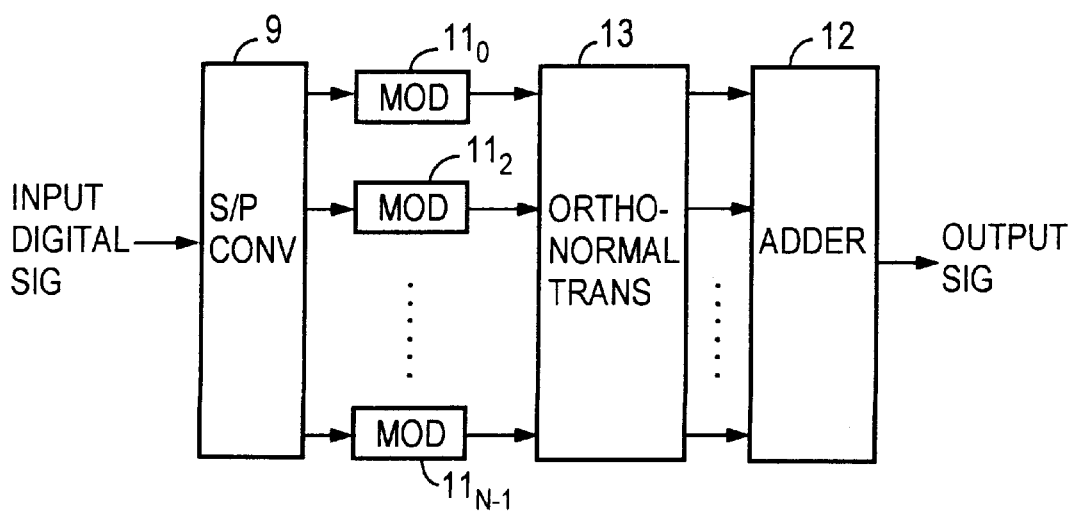
FIG. 12 is a block diagram illustrating another embodiment of the present invention.
Figure 13:
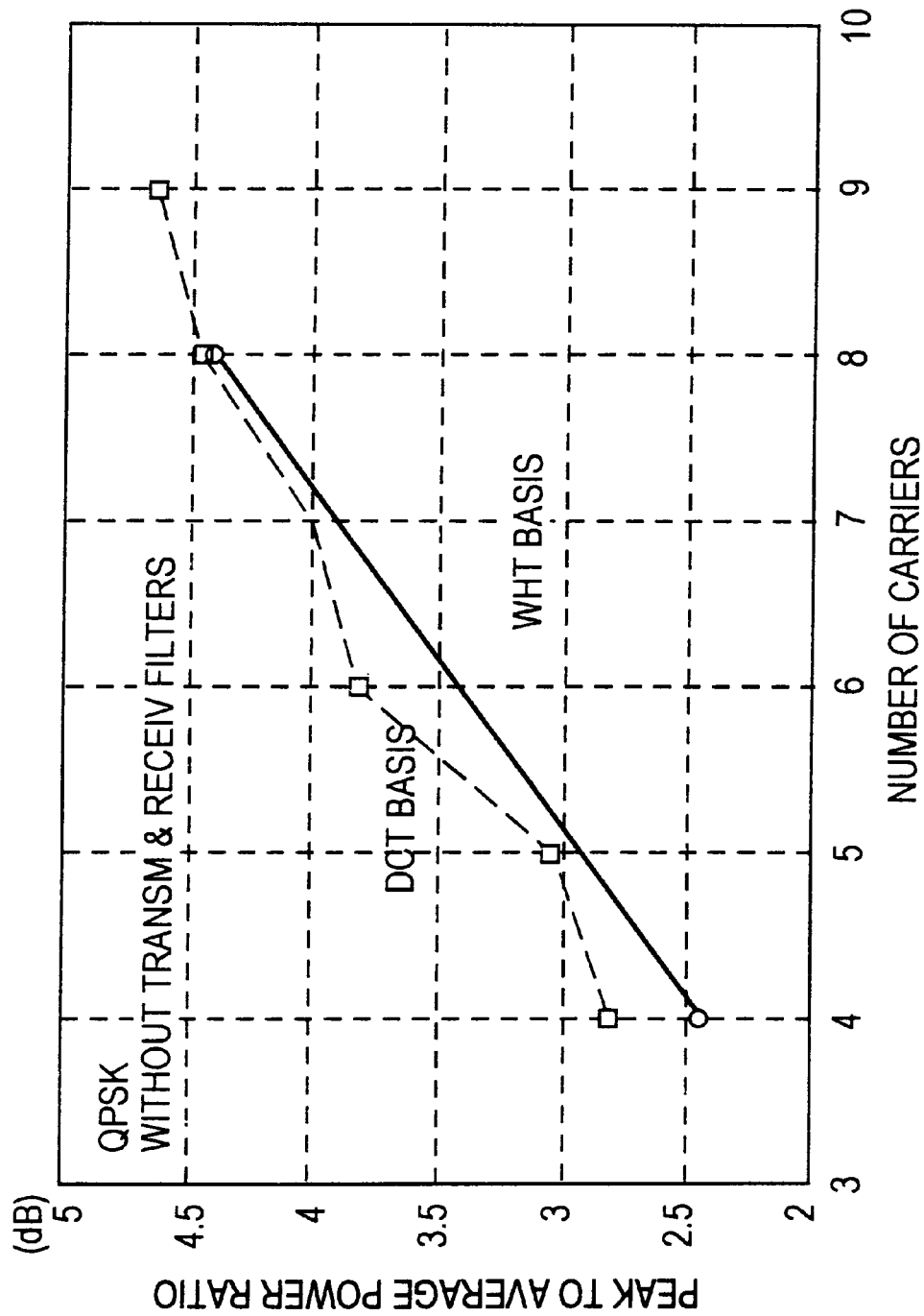
FIG. 13 is a graph showing the relationship between the peak-to-average power ratio in the embodiment of FIG. 12.

Next, a concrete example of the characteristic of the orthonormal transform part will be described. A description will be given of the peak power suppression effects and the transmission performance on a static communication channel in the cases of the orthonormal transform part 13 using the DCT base and the WHT base. FIG. 12 shows in block form the transmitting apparatus of the present invention used to check the peak power by computer simulations. The input digital signal is converted by a serial-to-parallel converter 9 into N-channel parallel digital signals, which are QPSK-modulated by the modulators 11$_0$ to 11$_{N-1}$ and then subjected to orthonormal transform processing by the orthonormal transform part 13, and the transformed outputs are added together, thereafter being transmitted. FIG. 13 shows the results of computer simulations of the peak power suppression effects by the orthonormal transform processing by the orthonormal transform parts 13 using the DCT base and the WHT base, respectively. The abscissa represents the number N of carriers multiplexed and the ordinate the peak to average power ratio. For FIG. 13, by using the DCT base and the WHT base, the peak to average power ratio can be made about 4.5 dB when eight carriers are multiplexed.

Figure 14:
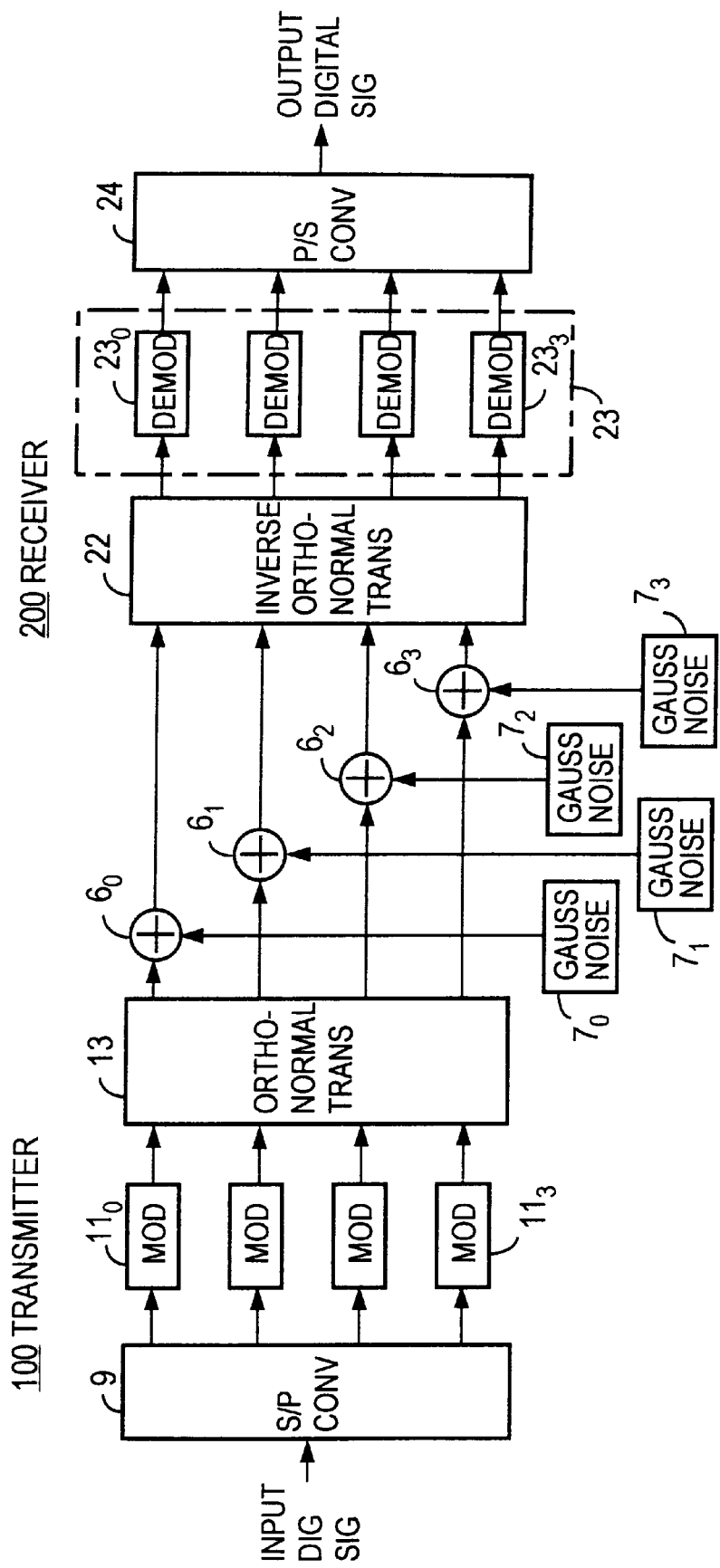
FIG. 14 is a block diagram illustrating another embodiment of the present invention adapted for parallel transmission.
Figure 15:
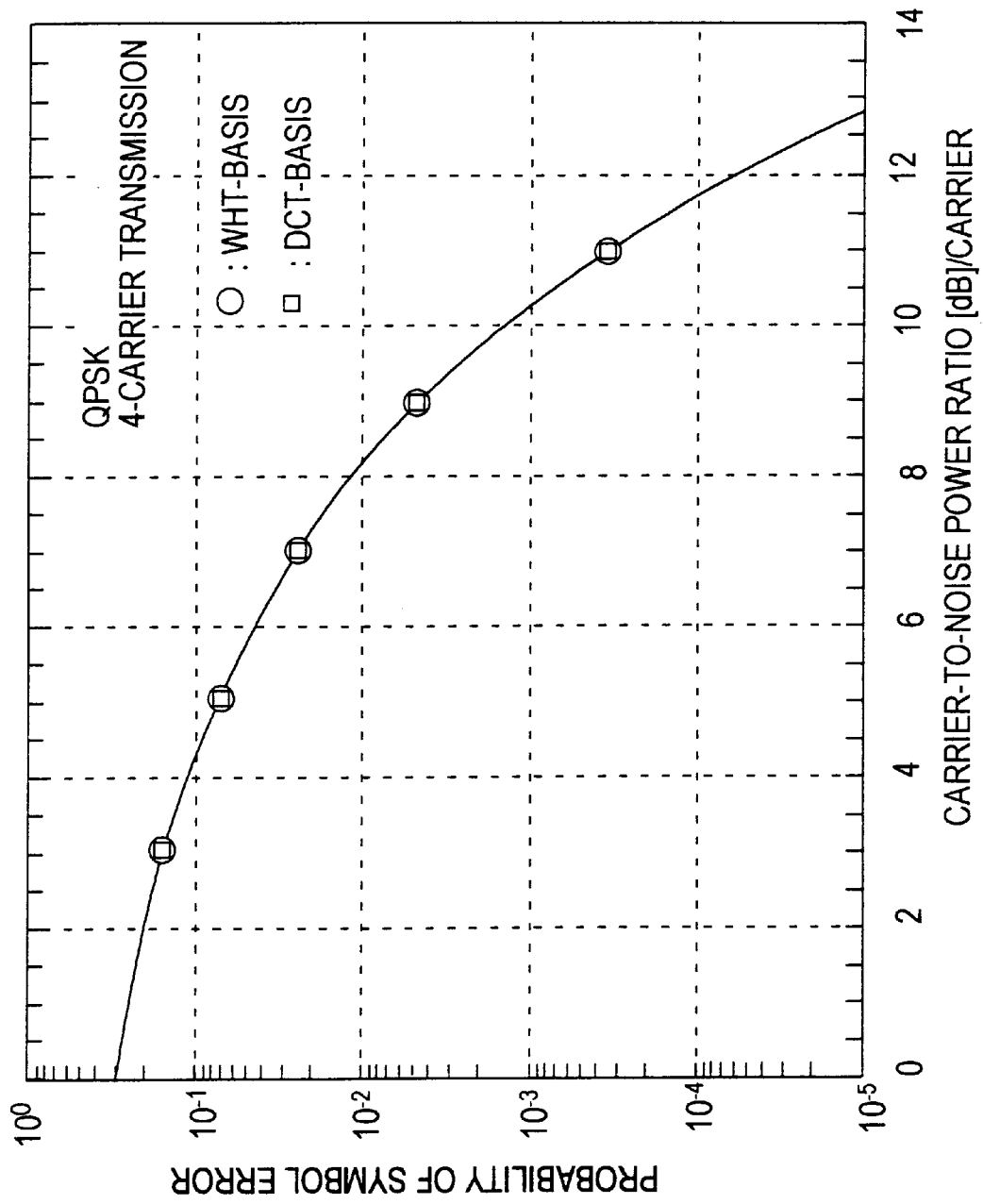
FIG. 15 is a graph showing the relationship between a symbol error rate and a carrier-to-noise power ratio in the embodiment of FIG. 14.

In FIG. 15, there are shown the results of computer simulations of the influence of noise of the transmission system according to the second aspect of the present invention wherein carriers are not multiplexed, the multiplexing part and the detection part are left out and the N-channel base-band signals are transmitted and received intact as shown in FIG. 14. The abscissa represents the carrier to noise ratio by Gaussian noise in the channel line and the ordinate a symbol error rate. Noises in the respective channel are simulated by adding white Gaussian noises from noise sources 7$_0$ to 7$_{N-1}$ by adders 6$_0$ to 6$_{N-1}$. It is seen from FIG. 15 that the transmission performance on the present invention using to the DCT and WHT bases does not degradation. The same goes for the transmission performance when the multiplexing part and the detection part are employed. The transmission and reception system of FIG. 14 is applicable, for example, to N-channel wired transmission. The receiving apparatus 200 has a parallel-to-serial converting part 24 connected to the output of the demodulation part 23.

In the transmission and reception system of FIG. 14, a digital signal of a single string is fed into the transmitting apparatus 100, wherein it is converted by the serial-to-parallel converting part 9 into digital signals of N channels (four channels in this example), which are modulated and subjected to orthonormal transformed processing by the orthonormal transform part 13, and the four-channel transformed outputs are sent over the four-channel transmission channel.

In the receiving apparatus 200, the N-channel received signals are subjected to inverse orthonormal transform processing by the inverse orthonormal transform part 22 and the transformed outputs are demodulated. The thus demodulated N-channel base-band signals are converted into a one-channel digital signal by a parallel-to-serial-converting part 24 connected to the output of the demodulation part 23.

Figure 16:
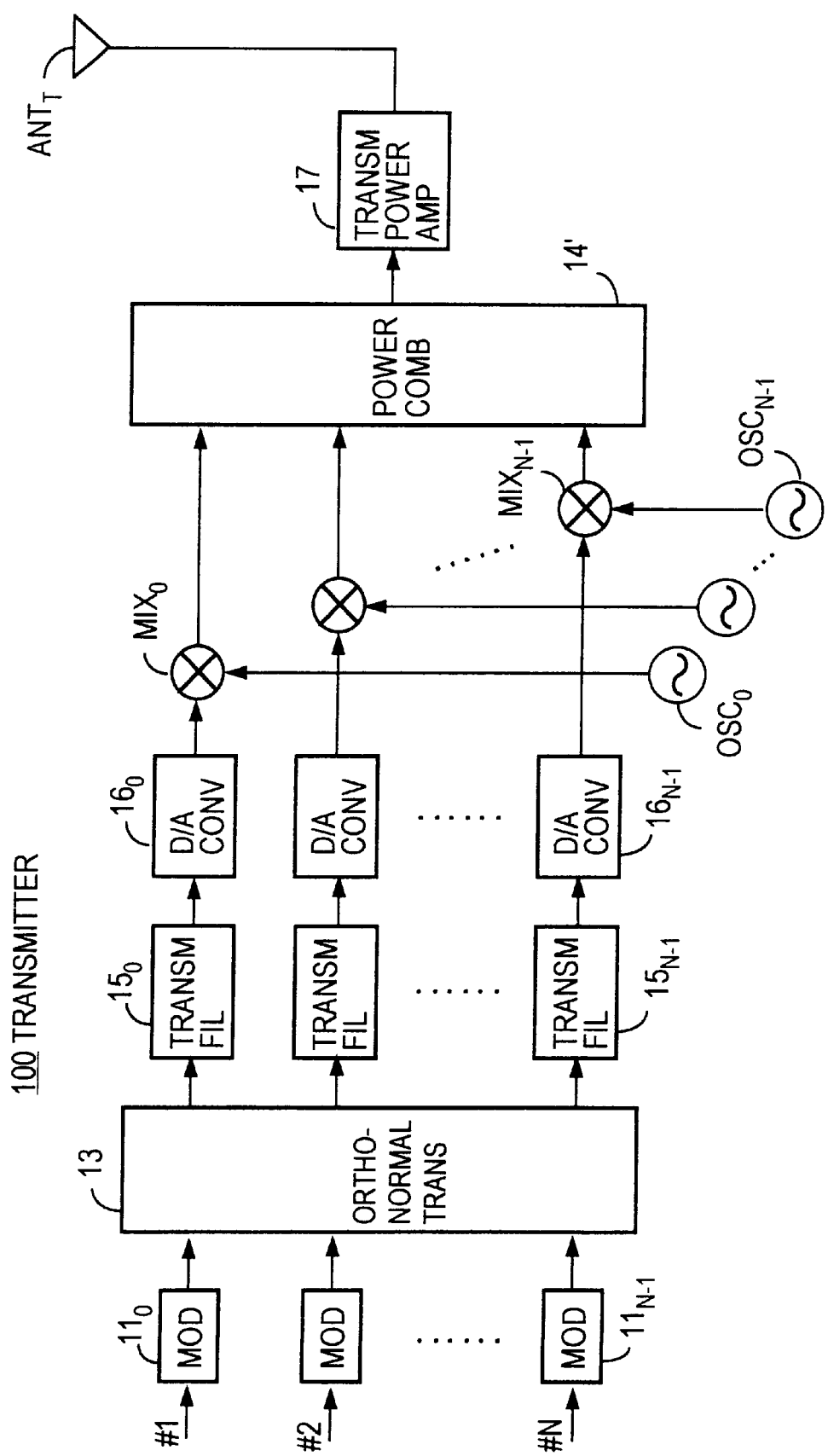
FIG. 16 is a block diagram illustrating the configuration of the transmitting apparatus of FIG. 8A when it is applied to a multicarrier transmission system.
Figure 17:
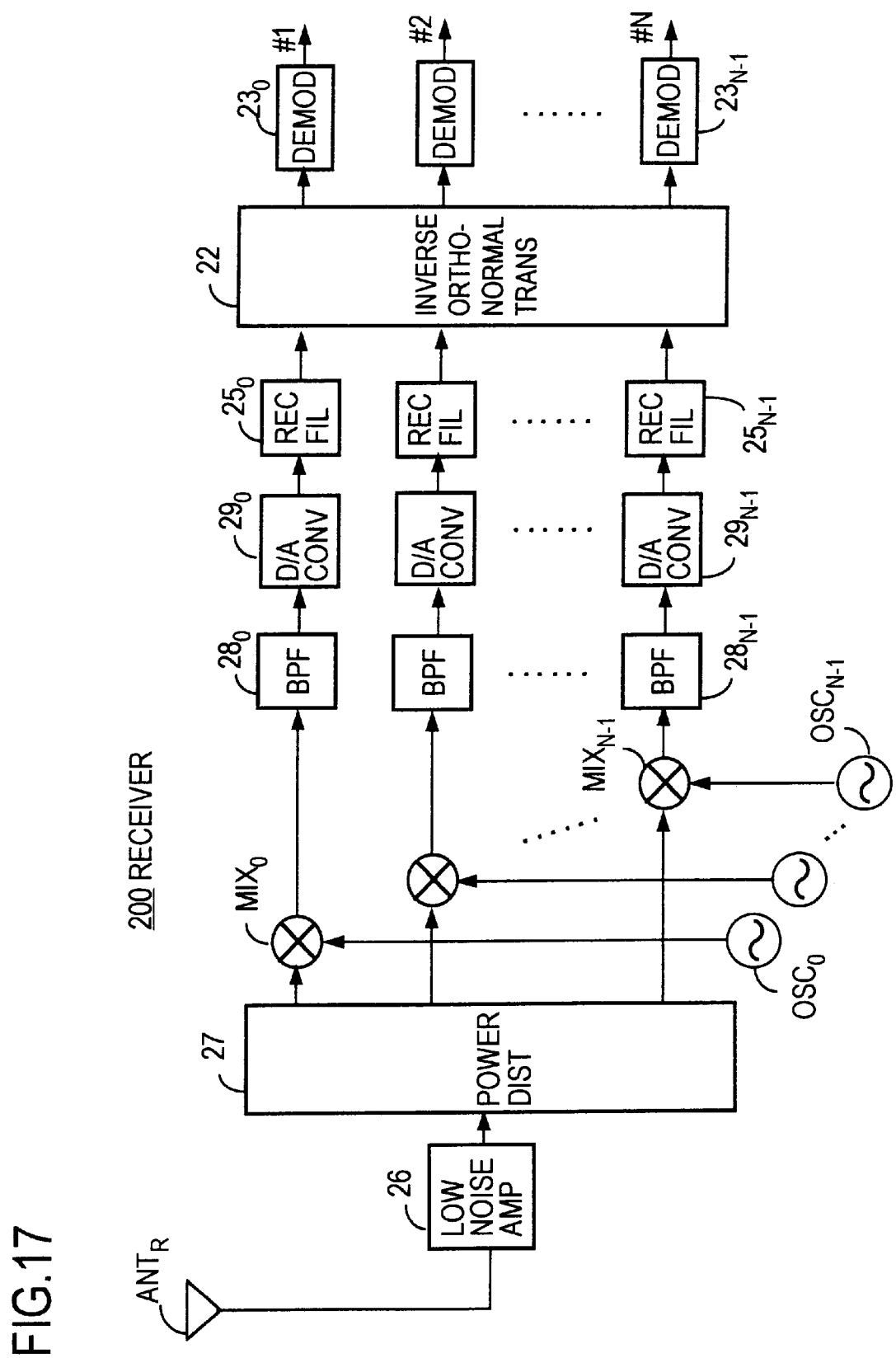
FIG. 17 is a block diagram illustrating the configuration of the receiving apparatus of FIG. 8B when it is applied to the multicarrier transmission system.

Next, a description will be given of an embodiment of the multicarrier transmission system according to the present invention. FIGS. 16 and 17 shows block form the transmitting apparatus 100 and the receiving apparatus 200, respectively, in the case of applying the present invention to the multicarrier transmission system. The transmitting apparatus 100 is made up of the modulators 11i (where i=0, ... ,N−1) into which digital signals #1 to #N are input, the orthonormal transform part 13, the transmitting filters 15$_i$ and digital-to-analog (D/A) converters 16$_i$. The modulators 11$_i$ forming a modulating part 11 receive different digital signals and modulate them in amplitude, phase or frequency. The plural modulator outputs are fed to the orthonormal transform part 13. The orthonormal transform part 13 processes the input signals by a predetermined matrix in such a manner as to decrease the cross-correlation coefficient between the transformed output signals $v_0(t)$ to $v_{N-1}(t)$. Each output signal $v_i(t)$ is converted by the D/A converter $16_i$ into analog form. The analog signal is mixed by a frequency mixer $MIX_i$ with a carrier from a carrier oscillator $OSC_i$ into a radio-frequency signal. In a power combining part 14' such radio-frequency signals of N channels are combined, thereafter being amplified by a power amplifier 17 and transmitted via an antenna $ANT_T$.

In the receiving apparatus 200 (FIG. 17), the radio-frequency signal received via an antenna $ANT_R$ and a low-noise amplifier 26 is power divided by a power divider part 27 into N channels, then the divided signals are each mixed by a mixer $MIX_i$ with a carrier from a carrier oscillator $OSC_i$, and the mixed signal is applied to a band-pass filter $29_i$ to obtain a base-band signal. The received base-band signal is converted by an A/D converter $29_i$ to a digital signal, which is fed via a receiving filter $25_i$ to the inverse orthonormal transform part 22 for inverse orthonormal transform processing. The inverse transformed output is demodulated by the demodulator $23_i$ into data signals. In this way, in the case of the multicarrier transmission system, the number of carriers used is the numbers of rows or columns of the orthonormal transform matrix.

Now, the relationship between the cross correlation coefficient and the peak power in the 4-channel QPSK transmission will be described. The correlation matrix $R_{uu}(t)$ of the input signal vector u(t) in the orthonormal transform part 13 at time t according to the present invention is as follows:

$$R_{uu}(t) = u(t)u^H(t) \quad (27)$$

In general, no orthogonality is retained between elements of the vector u(t). On this account, Eq. (27) is usually expressed as follows:

$$R_{uu}(t) = \begin{bmatrix} u_0(t)u_0^*(t) & u_0(t)u_1^*(t) & \cdots & u_0(t)u_{N-1}^*(t) \\ u_1(t)u_0^*(t) & u_1(t)u_1^*(t) & \cdots & u_1(t)u_{N-1}^*(t) \\ \vdots & \vdots & \cdots & \vdots \\ u_{N-1}(t)u_0^*(t) & u_{N-1}(t)u_1^*(t) & \cdots & u_{N-1}(t)u_{N-1}^*(t) \end{bmatrix} \quad (28)$$

The cross correlation coefficient $\gamma_{ij}(t)$ of each element (i,j) of the correlation matrix $R_{uu}(t)$ of Eq. (28) at time t is defined as follows:

$$\gamma_{ij}(t) = u_i(t)u^*_j(t)/\{|u_i(t)||u^*_j(t)|\} \quad (29)$$

Based on Eq. (29), the overall cross correlation coefficient $\Gamma(t)$ is defined as follows:

$$\Gamma(t) = \{1/(N^2 - N)\} \sum_{i=0}^{N-1}\sum_{j=0}^{N-1} \gamma_{ij}(t) \quad \text{where } i \neq j. \quad (30)$$

Figure 18:
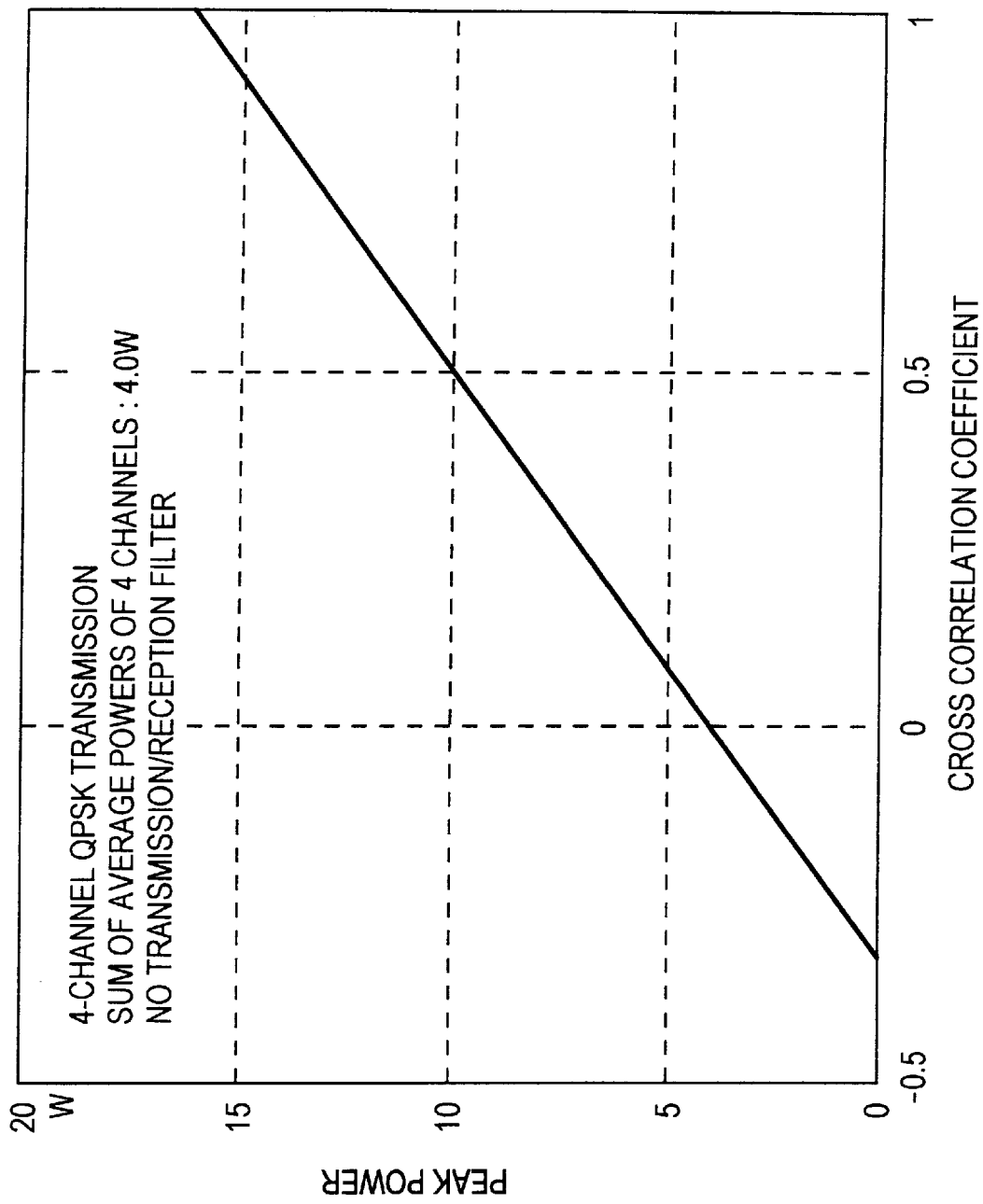
FIG. 18 is a graph showing the relationship between the peak power of a signal obtained by multiplexing 4-channel QPSK signals and the correlation coefficient between signals of the respective channels.
Figure 19:
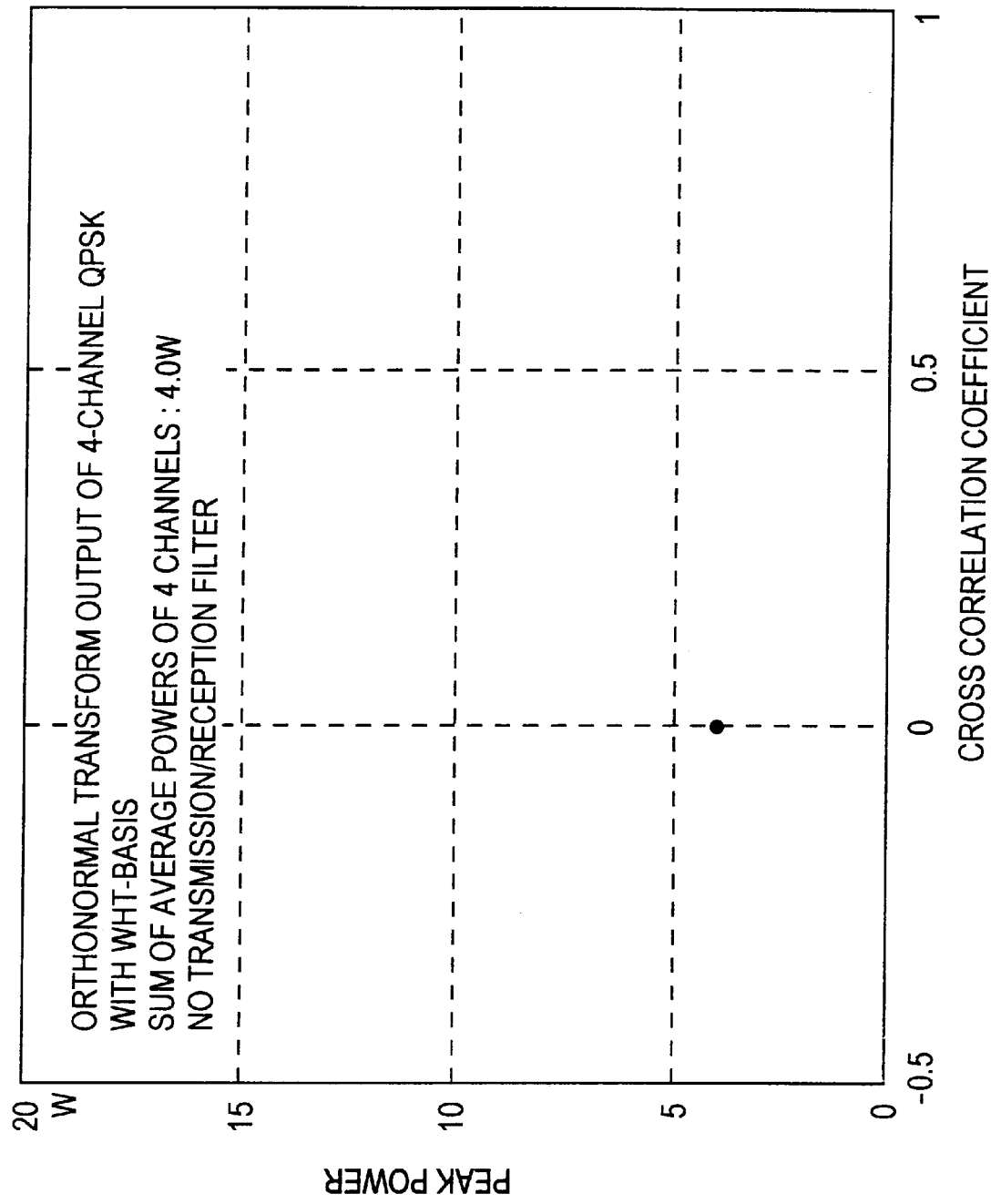
FIG. 19 is a graph showing the relationship between the peak power of a signal obtained by multiplexing 4-channel QPSK signals after subjecting them to orthonormal transform processing using the WHT base and the correlation coefficient between transformed signals of the respective channels.
Figure 20:
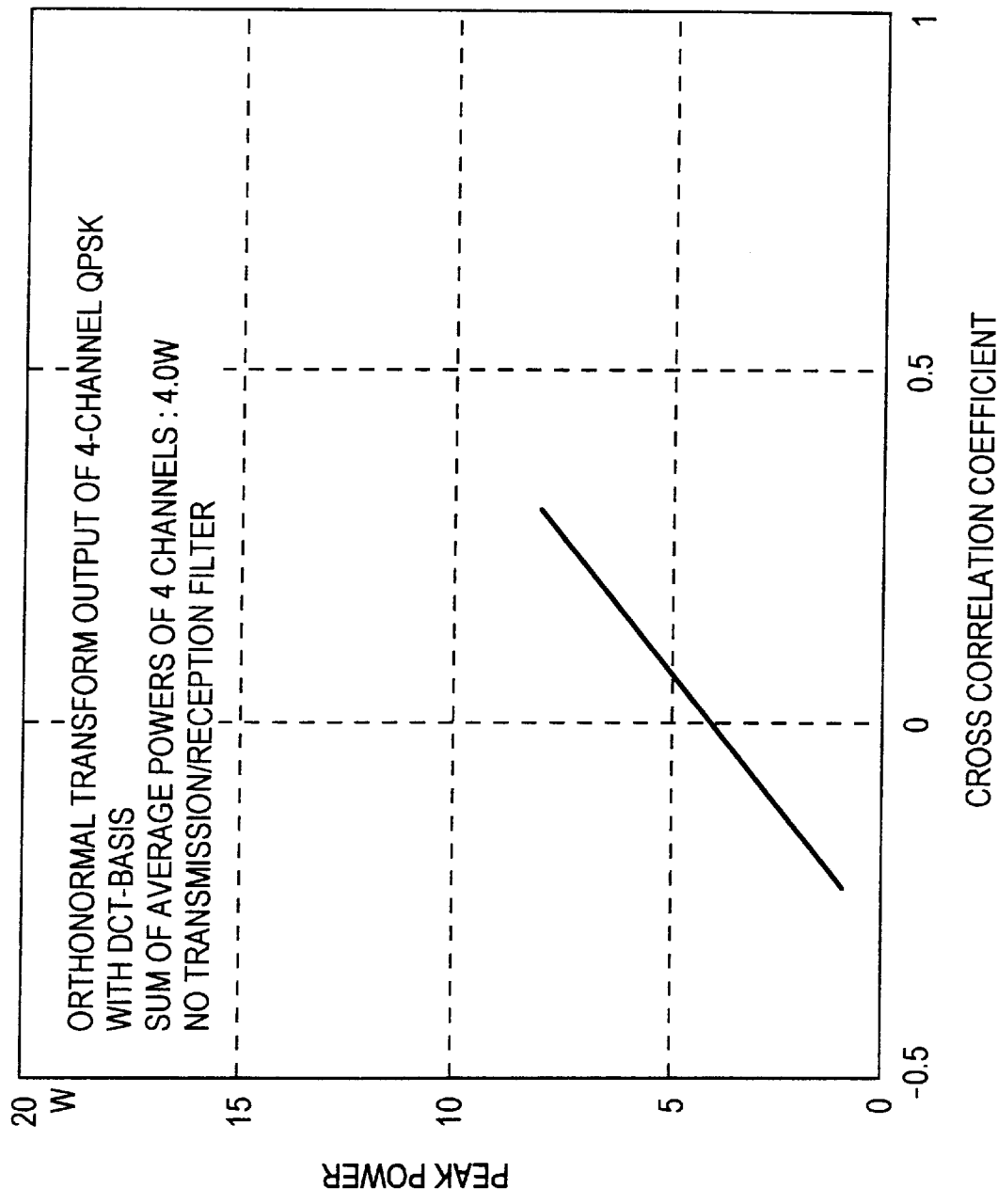
FIG. 20 is a graph showing the relationship between the peak power of a signal obtained by multiplexing 4-channel QPSK signals after subjecting them to orthonormal transform processing using the DCT base and the correlation coefficient between transformed signals of the respective channels.

In FIGS. 18, 19 and 20, there are shown the results of calculations of the peak power in the 4-channel QPSK transmission in the cases where no orthonormal transform processing is involved as in the prior art, where orthonormal transform processing is performed using the WHT base and where orthonormal transform processing is performed using the DCT base, Eq. (30) being used as an evaluation parameter. In these examples, it is assumed that the base-band signals are simply multiplexed.

In FIG. 18, the abscissa represents the cross correlation coefficient given by Eq. (30) and the ordinate the peak power. As is evident from FIG. 18, when the cross correlation coefficient is 0, the peak power is 4.0 [W], equal to the sum of average power values in the respective channels. The cross correlation coefficient is −0.3 while the peak power is 0. The cross correlation coefficient is 1.0 while the peak power is 16. Thus, in the case of the 4-channel QPSK transmission, the peak power depends on the cross correlation of the modulated waves that are multiplexed.

The abscissa and ordinate in FIG. 19 are the same as those in FIG. 18. This is an example of using the WHT base as the orthonormal transform base. The input signals used are the same as in the case of FIG. 18. As will be seen from FIG. 19, when the cross correlation coefficient is 0, the peak power is 4.0 [W]. Thus, when the WHT base is used, the peak power and the sum of the average power values of the input signals are in agreement with each other. Furthermore, the cross correlation coefficient does not vary. This is because the orthonormal transform part 13 orthogonalizes the input signals.

The abscissa and ordinate in FIG. 20 are the same as those in FIG. 19. This is an example of using the DCT base as the orthonormal transform base. The input signals used are the same as in the case of FIG. 18. As is evident from FIG. 20, too, the correlation coefficient in the range of −0.33 to 0.35 is in proportion to the peak power. The graph indicates that the peak power can be decreased by the present invention; namely, the maximum peak power in FIG. 18 is 16 [W] in the FIG. 18 prior art example, whereas in FIG. 20 it is 8 [W].

As mentioned above, according to the present invention that decreases the correlation between the modulated signals to be multiplexed, the peak power of the multiplexed modulated signal can be made small.

In FIGS. 10A and 10B, the transmitting filter 15 and the receiving filter 25 are shown to be connected to the input side of the orthonormal transform part 13 and the output side of the inverse orthonormal transform part 22, respectively, whereas in FIGS. 16 and 17 the filters 15 and 15 are shown to be connected to the output side of the orthonormal transform part 13 and the input side of the inverse orthonormal transform part 22, respectively. Now, a description will be made of operations in FIGS. 16 and 17.

Let the M-order complex impulse response of the transmitting filter 15 be represented by h, the output vector of the orthonormal transform part 13 by v(t), the output signal vector of the orthonormal transform part 13 from the current back to time M by $V_i(t)$ and the transmitting filter output $w_{tx}(t)$.

$$w_{tx}(t) = [w^{(tx)}_0(t)w^{(tx)}_1(t)w^{(tx)}_2(t) \ldots w^{(tx)}_{N-1}(t)]^T \quad (31)$$

$$V_i(t) = [v_i(t)v_i(t-1)v_i(t-2) \ldots v_i(t-M+1)]^T \quad (32)$$

$$h = [h_0 h_1 h_2 \ldots h_{M-1}]^T \quad (33)$$

$$w^{(tx)}_i = h^H V_i(t) \quad (34)$$

In Eq. (34), the transmitting filter output $w^{(tx)}_i(t)$ in the i-th channel is subject to band limitation by the M-order complex impulse response h.

Let the M-order complex impulse response of the receiving filter 25 be represented by h as is the case with the transmitting filter 15, the output signal vector from the mixer $MIX_i$ of the i-th channel from the current back to time M by $Z_i(t)$ and the transmitting filter output $w_{tx}(t)$.

$$w_{rx}(t)=[w^{(rx)}{}_0(t)w^{(rx)}{}_1(t)w^{(rx)}{}_2(t) \ldots w^{(rx)}{}_{N-1}(t)]^T \quad (35)$$

$$Z_i(t)=[z_i(t)z_i(t-1)z_i(t-2) \ldots z_i(t-M+1)]^T \quad (36)$$

$$w^{(rx)}{}_i=h^H Z_i(t) \quad (37)$$

In Eq. (35), the receiving filter output $w^{(rx)}{}_i(t)$ in the i-th channel is subject to band limitation by the M-order complex impulse response h.

In some of the embodiments described above no particular mention has been made of the type of channel for the transmitting and receiving system, but in the case of using a radio-frequency carrier, the channel may be space or a metallic cable. With the usefulness of electrooptic transducing techniques, an optical fiber cable can also be used. A description will be given of typical transmitting and receiving systems that employ the optical fiber cable and the metallic cable, respectively.

Figure 21:
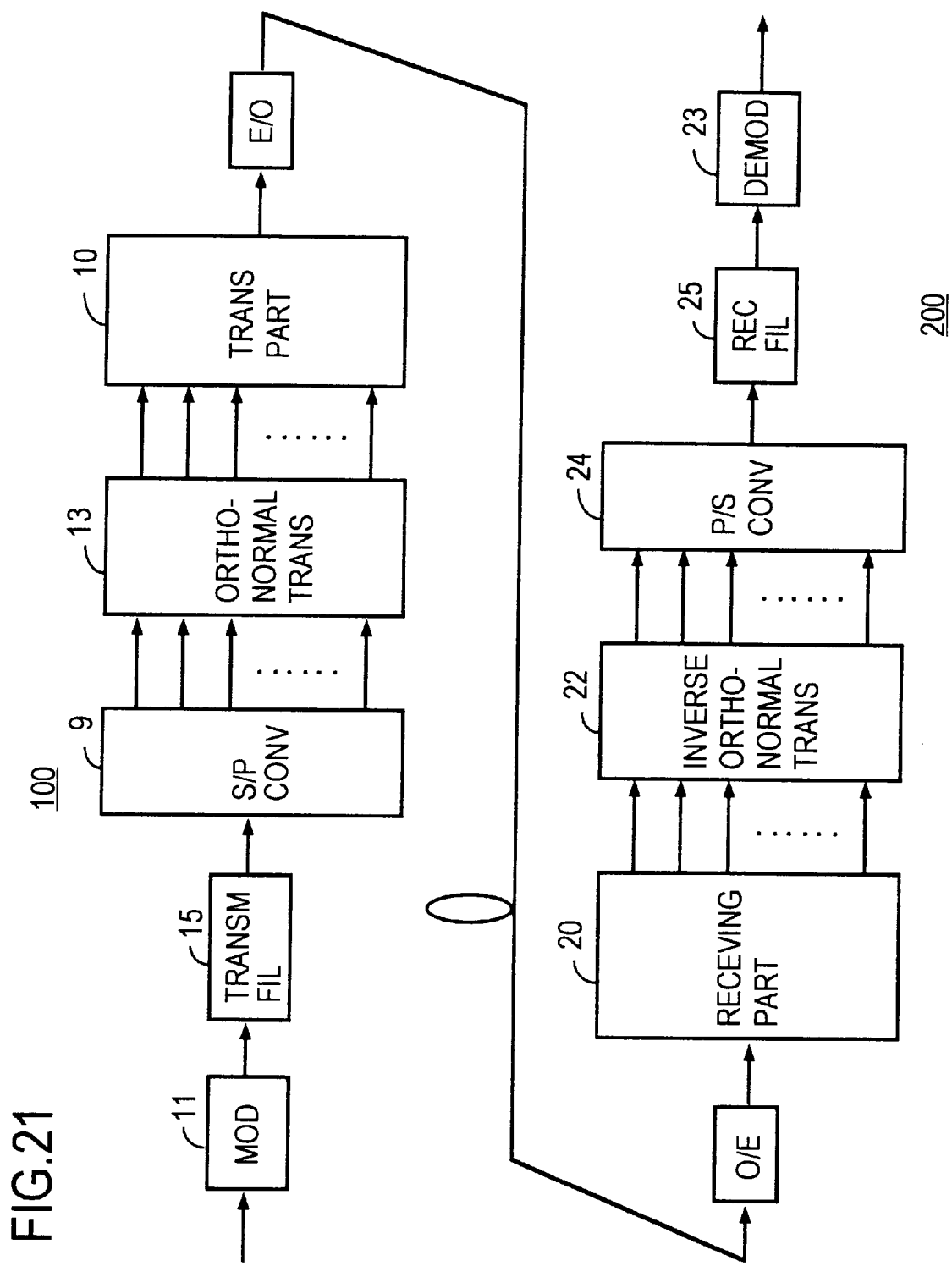
FIG. 21 is a block diagram illustrating a transmission/reception system when the present invention is applied to multicarrier transmission over a transmission line formed by an optical fiber cable.

FIG. 21 illustrates an embodiment of a parallel transmission system employing an optical fiber cable 31. The transmitting apparatus 100 is made up of the modulator 11, the transmitting filter 15, the serial-to-parallel converting part 19, the orthonormal transform part 13, a transmitting part 10 and an electrooptic transducer E/O. The transmitting part 10 has the signal multiplexing part 14 and the frequency converting part MIX. The receiving apparatus 200 is made up of an optoelectronic transducer O/E, a receiving part 20, the inverse orthonormal transform part 22, the parallel-to-serial converting part 14, the receiving filter 25 and the demodulator 23. The receiving part 20 has the frequency converting part MIX and a demultiplexing part 27. The demultiplexing part 27 for demultiplexing the multiplexed signal is formed by a band-pass filter for a signal multiplexed in terms of frequency, by a despreader for a signal multiplexed using a spreading code and by a wavelength detecting filter for a signal multiplexed in terms of wavelength.

The information signal to be transmitted is modulated by the modulator 11. The transmitting filter 15 is implemented by digital signal processing and performs shaping of the modulated signal into a waveform optimum for transmission over the channel. The serial-to-parallel converting part 9 converts the digital signal train output from the transmitting filter 15 into parallel signals. The parallel digital signals are simultaneously fed into the orthonormal transform part 13. The orthonormal transform part 13 processes the input digital signals and outputs parallel digital signals of decreased cross-correlation for fed into the transmitting part 10. The transmitting part 10 multiplexes the input signals in terms of frequency, a spread code, or wavelength. The multiplexed signal is converted by the electrooptic transducer E/O into an optical signal, which is sent over the optical fiber cable 31 to the receiving apparatus 200.

In the receiving apparatus 200, the received optical signal is converted by the optoelectronic transducer O/E into an electrical signal. The receiving part 20 demultiplexes the received signal multiplexed using frequency, spread code or wavelength. The demultiplexed signals are inversely transformed by the inverse orthonormal transform part 22 and the inversely transformed output signals therefrom are applied to the parallel-serial converting part 24, wherein they are converted to reconstruct the digital signal sequence. The thus reconstructed signal is waveform-shaped by the receiving filter 25 and then demodulated by the demodulator 23.

In the embodiment of FIG. 21, it is possible to remove the electrooptic transducer E/O and the optoelectronic transducer O/E and use a metallic cable in place of the optical fiber cable 31 to connect the output of the transmitting part 20 to the input of the receiving part 20. This embodiment permits parallel transmission using the orthonormal transform processing.

Figure 22:
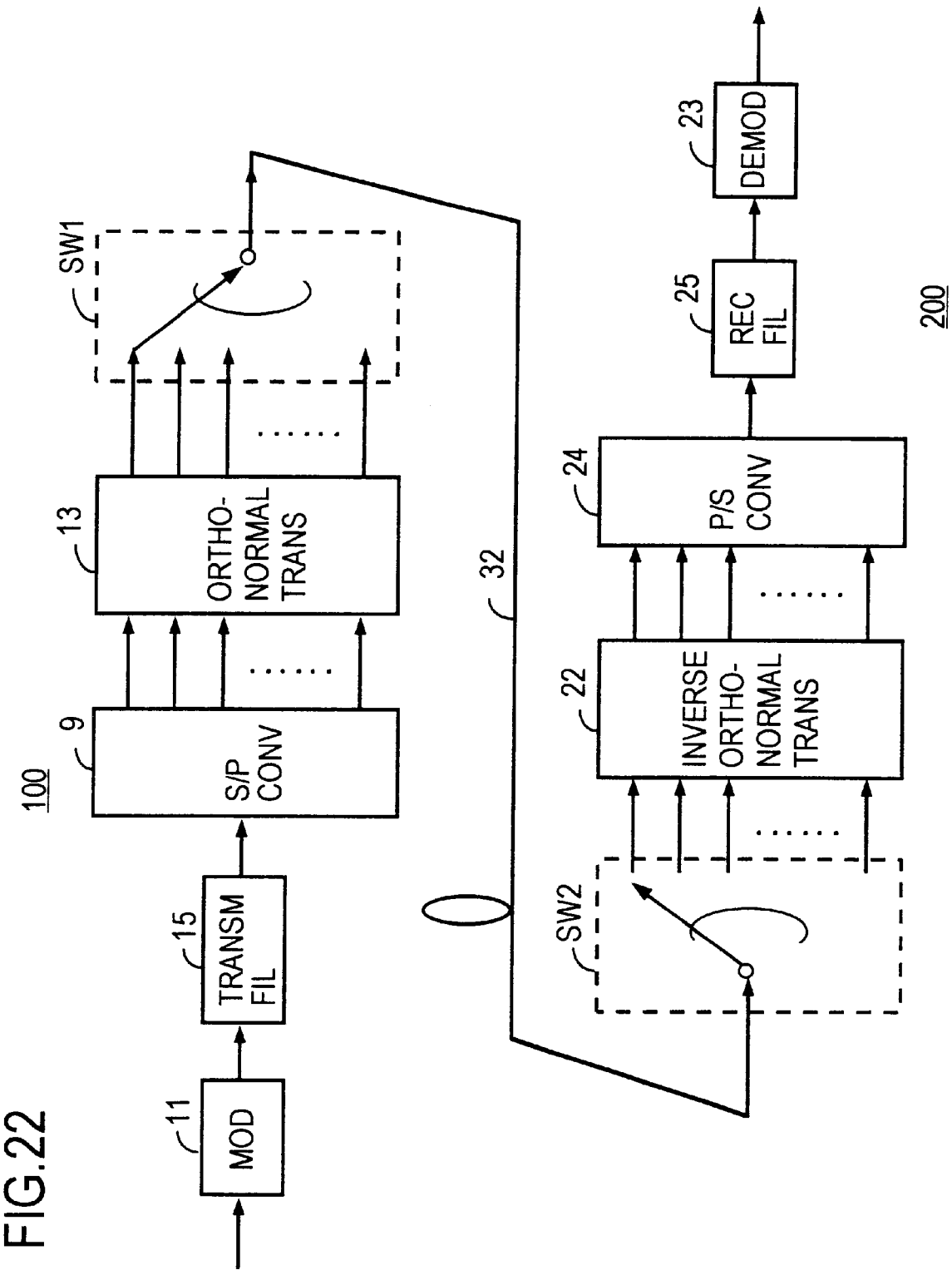
FIG. 22 is a block diagram illustrating a transmission/reception system when the present invention is applied to multicarrier transmission over a transmission line formed by a metallic cable.

FIG. 22 shows an embodiment of base-band transmission using the metallic cable. The transmitting apparatus 100 comprises the modulator 11, the transmitting filter 15, the serial-to-parallel converting part 9, the orthonormal transform part 13 and a switch SW1. The receiving apparatus 200 comprises a switch SW2, the inverse orthonormal transform part 22, the parallel-to-serial converting part 24, the receiving filter 25 and the demodulator 23.

The information signal to be transmitted is modulated by the modulator 11. The transmitting filter 15 is implemented by digital signal processing and performs shaping of the modulated signal into a waveform optimum for transmission over a metallic cable. The serial-to-parallel converting part 9 converts the digital signal sequence output from the transmitting filter 15 into parallel signals. The parallel digital signals are simultaneously fed into the orthonormal transform part 13. The orthonormal transform part 13 processes to conversion from the input digital signals to outputs parallel digital signals of decreased cross-correlation, which are fed into the switch SW1. The switch SW1 selects the output signals from the orthonormal transform part 13 in the order of transmission over the channel 32. The output signals are sent after being subjected to signal processing optimum for transmission over the metallic cable 32.

In the receiving apparatus 200, the received signals sent over the metallic cable 32 is A/D-converted into digital signals, which are applied to the switch SW2 to reconstruct the parallel digital signal sequence constructed at the transmitting side. The thus reconstructed digital signal sequence is inversely transformed by the inverse orthonormal transform part 22, and the inversely transformed output signals are waveform shaped by the receiving filter 25, thereafter being demodulated by the demodulator 23. In this way, the base-band transmission using the orthonormal transform scheme can be carried out.

Figure 23:
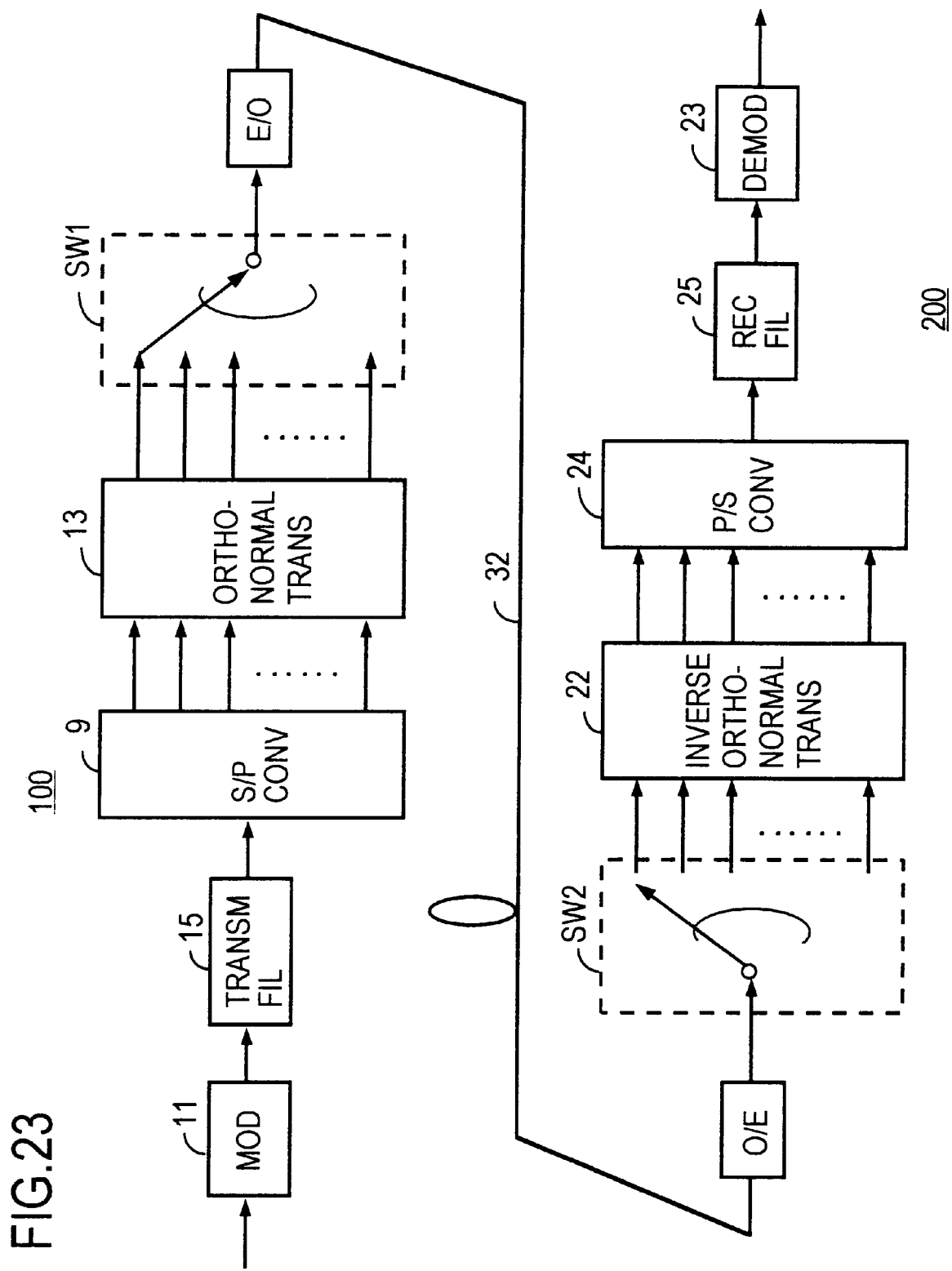
FIG. 23 is a block diagram illustrating a transmission/reception system when the present invention is applied to base band transmission over a transmission line formed by a metallic cable.

FIG. 23 shows a modified form of the FIG. 22 embodiment, in which an electrooptic transducer E/O is connected to the output of the switch SW1, an optoelectronic transducer O/E is connected to the input of the switch SW2 and the optical fiber cable 31 is used in place of the metallic cable 32 to interconnect the transducers E/O and O/E.

Figure 24:
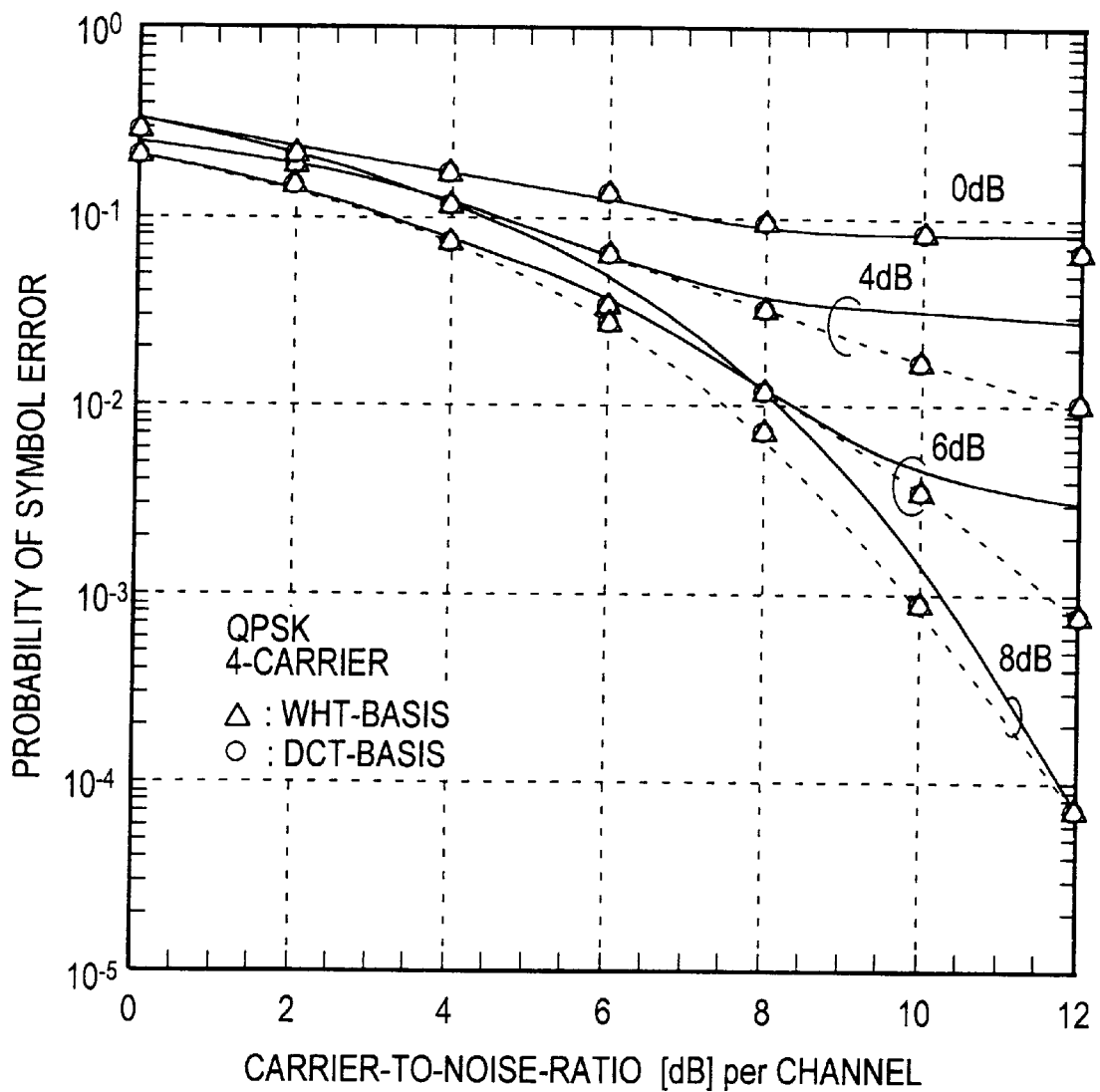
FIG. 24 is a graph for explaining the effect of the present invention applied to 4-channel multicarrier transmission using the QPSK scheme.

FIG. 24 shows the effect of the parallel transmission system of the present invention in the 4-multicarrier transmission using the QPSK scheme. In FIG. 24, the abscissa represents the carrier-to-noise power ratio (CNR) by Gaussian noise that is added to the signal on the channel, and the ordinate represents the probability of symbol error. In an N-channel, the additive white Gaussian noises from noise sources $7_0$ to $7_{N-1}$ (FIG. 14) are provided by adders $6_0$ to $6_{N-1}$. Computer simulations additive white in such a manner as described below. The CNR values in one channel for example, i=0, were fixedly set at 0, 4, 6 and 8 dB in a sequential order and the Gaussiam noise levels to be provided from the noise sources 71, 72 and 73 were controlled so that the CNR values in the other remaining channels i=1,2,3 became 0, 2, 4, . . . , 12 dB with respect to the fixedly set CNR values of the channel i=0 as shown on the abscissa in FIG. 24. The calculation results of the probability of symbol errors in the base-band digital signal output in the receiving apparatus 200 in the cases of using the WHT base and the DCT base for the orthonormal transform processing in the orthonormal transform part 13 under the above-mentioned conditions are broken lines connecting corresponding symbols are shown in comparison with the solid lines representing theoretical values of symbol error probability in the cases of the present invention being not applied. The above-mentioned conditions are based on the assumption that the channel performance is seriously deteriorated in one or more channels. The theoretical values P are calculated as $P=(P_{fix}+P_1+P_2+P_3)/4$, where $P_{fix}$ represents probability of symbol errors for a channel in which channel quality is fixed, and $P_1$, $P_2$ and $P_3$ each represent probability of symbol errors of the remaining three channels.

As will be seen from FIG. 15, for example, when the fixed CNR value in the channel i=0 is 4 dB, the probability of symbol error in the output base-band digital signal from the parallel-to-serial converting part 24 undergoes about the same change until the CNR values in the other three channels also reach 4 dB, irrespective of whether the present invention is applied or not, but when the CNR values in the channels i=1,2,3 exceed 4 dB, the probability of symbol error is not so much improved in the case of the present invention being not used, whereas in the case of applying the invention the probability of symbol error is further improved. The same goes for the cases where the CNR values in the channel i=0 are 6 and 8 dB. This means that in the transmission of N-channel modulated signals over N-channel after orthonormal transform processing of the modulated signals according to the present invention, even if the channel performance of one channel is degraded, the probability of symbol error in the received base-band digital signal can be improved more than in the prior art that does not utilize the orthonormal transform scheme. That is, it can be said that the present invention produces a kind of error correcting effect.

EFFECT OF THE INVENTION

As referred to previously, the prior art has the defects that the number of carriers for parallel transmission increases and that various schemes cannot be applied to arbitrary input signals. The present invention obviates these problems as mentioned below in (a) and (b).

(a) Increase in the number of carriers for parallel transmission:It is evident that the use of the orthonormal transform part does not cause by increasing in the number of channels of the channel as indicated by Eq. (5). The peak power suppression effect by the present invention is shown in FIG. 13. Hence, the present invention permits suppression of the peak to average power ratio without increasing the number of channels.

(b) Statistical properties of input signal: In the derivation of the principles of the present invention, statistical properties of the input signal are not defined as indicated by Eq. (1). Therefore, the present invention allows suppression of the peak to average power ratio that is increased by multiplexing of plural modulated signals, without depending on the statistical properties of the input signal.

Additionally, the present invention produces the following effects:

(c) The information for transmission in parallel is transformed by the orthonormal transform part into a form that is defined by an orthonormal transform matrix, and the information to be transmitted primarily over one channel is apparently distributed all over the channels, so that even if a signal in one channel drops out, it can be restored or reconstructed to some extent using signal information in the other remaining channels. Hence, it is possible to offer a transmission system that is robust against variations in the performance of the channel.

(d) Since the orthonormal transform matrix is implemented by digital signal processing, the circuitry can be simplified.

(e) Since the coefficients of the orthonormal transform matrix can be changed as required, it is possible to flexibly cope with systems of various sizes.

(f) Security of communications can be provided by hidden from the orthonormal transform matrix secret from others.

(g) A diversity effect can be produced by distributed transmission due to orthonormal transform part.

It will be apparent that many modifications and variations may be effected without departing from the scope of the novel concepts of the present invention.

What is claimed is:

1. A transmitting apparatus comprising:

modulating means for modulating carriers of N different frequencies with parallel digital signals of N channels, respectively, to produce N modulated signals, said N being an arbitrary integral equal to or greater than 2;

orthonormal transform means for performing orthonormal transform processing of said modulated signals of N channels from said modulating means in a manner to reduce the cross-correlation between transformed output signals and for outputting said transformed signals of N channels; and multiplexing means for multiplexing said transformed signals of N channels from said orthonormal transform means to produce a multiplexed signal and for transmitting the multiplexed signal.

2. The transmitting apparatus of claim 1, further comprising a transmitting filter for band limitation use connected to the input or output side of said modulating means.

3. The transmitting apparatus of claim 1, further comprising serial-parallel converting means connected to the input side of said modulating means, for converting a serial digital input signal into said N-channel parallel digital signals for input into said modulating means.

4. The transmitting apparatus of claim 1, further comprising; switching means for sequentially selecting N-channels output signals from said orthonormal transform means to output them in a serial form; and electrooptic transducing means for transducing said serial signal from said switching means into an optical signal and for transmitting it over an optical fiber cable.

5. The transmitting apparatus of claim 1, further comprising switching means for sequentially selecting said N-channel output signals from said orthonormal transform means to output them in a serial form to a metallic cable.

6. The transmitting apparatus of claim 1, wherein said orthonormal transform means is transform means based on a WHT base.

7. The transmitting apparatus of claim 1, wherein said orthonormal transform means is transform means based on a DCT base.

8. The transmitting apparatus of claim 1, wherein, letting the vector of an input signal into said orthonormal transform means at time t be represented by u(t), a complex base-band signal in an i-th channel by $u_i(t)$ (where i=0, 1, . . . , N−1), an N×N orthonormal transform matrix to be implemented by said orthonormal transform means by A, an element (i,j) of its complex number by the vector of an orthonormal transform base by $a_i$, the vector of the output from said orthonormal transform means by v(t), and a complex output signal in said i-th channel by $v_i(t)$ and letting T represent a transposition, $$A = \begin{bmatrix} a_{0,0} & a_{0,1} & \cdots & a_{0,N-1} \\ a_{1,0} & a_{1,1} & \cdots & a_{1,N-1} \\ \vdots & \vdots & & \vdots \\ a_{i,0} & a_{i,1} & \cdots & a_{i,N-1} \\ \vdots & \vdots & & \vdots \\ a_{N-1,0} & a_{N-1,1} & \cdots & a_{N-1,N-1} \end{bmatrix}$$

$a_i = (a_{i0} a_{i1} \ldots a_{iN-1})$ $v(t) = [v_0(t) v_1(t) \ldots v_{N-1}(t)]^T$ $v(t) = Au(t)$ and said orthonormal transform matrix A satisfies $$\sum_{n=0}^{N-1} a_{in} a_{jn}^* = \delta_{ij}$$

where $\delta_{ij}$ is 1 when i=j and 0 when i≠j and * is a complex conjugate.

9. A receiving apparatus for receiving, through N channels, signals having been subjected to orthonormal transform processing in a transmitting apparatus and transmitted therefrom over the N channels, said receiving apparatus comprising:

inverse orthonormal transform means for receiving said signals through N channels and for subjecting the received signals of N channels to transform processing inverse to said orthonormal transform processing to generate modulated signals which have been modulated with carriers of different frequencies corresponding to N channels;

demodulation means for demodulating said modulated signals of N channels from said inverse orthonormal transform means to generate digital signals of N channels; and detecting means for detecting said signals of N channels to output baseband signals for input into said inverse orthonormal transform means.

10. The receiving apparatus of claim 9, further comprising a receiving filter for band limitation use connected to the input or output side of said inverse orthonormal transform means.

11. The receiving apparatus of claim 9, further comprising parallel-to-serial converting means connected to the output side of said demodulation means, for converting N-channel parallel digital signals into one serial digital signal.

12. A receiving apparatus for receiving, through N channels, signals having been subjected to orthonormal transform processing in a transmitting apparatus and transmitted therefrom over the N channels, said receiving apparatus comprising:

inverse orthonormal transform means for receiving said signals through N channels and for subjecting the received signals of N channels to transform processing inverse to said orthonormal transform processing to generate modulated signals which have been modulated with carriers of different frequencies corresponding to N channels;

demodulation means for demodulating said modulated signals of N channels from said inverse orthonormal transform means to generate digital signals of N channels; and a receiving filter for band limitation use connected to the input or output side of said inverse orthonormal transform means.

13. A receiving apparatus for receiving, through N channels, signals having been subjected to orthonormal transform processing in a transmitting apparatus and transmitted therefrom over the N channels, said receiving apparatus comprising:

inverse orthonormal transform means for receiving said signals through N channels and for subjecting the received signals of N channels to transform processing inverse to said orthonormal transform processing to generate modulated signals which have been modulated with carriers of different frequencies corresponding to N channels;

demodulation means for demodulating said modulated signals of N channels from said inverse orthonormal transform means to generate digital signals of N channels; and parallel-to-serial converting means connected to the output side of said demodulation means, for converting the parallel digital signals of N channels into one serial digital signal.

14. A method for transmission and reception which transmits N-channels signals over N-transmission channels and, at the receiving side, demodulates said received N-channel signals, said method comprising the steps of:

(a) subjecting N-channel modulated signals to orthonormal transform processing at the transmitting side to generate N-channel transformed signals of low cross-correlation and transmitting them over said N-transmission channels;

(b) receiving said N-channel transmitted signals at the receiving side and subjecting them to transform processing inverse to said orthonormal transform processing to obtain N-channel modulated signals; and (c) demodulating said N-channel modulated signals into said N-channel digital signals.

15. A method for transmission and reception which transmits N-channels signals over an N-transmission channels and, at the receiving side, demodulates said received N-channel signals, said method comprising the steps of:

(a) subjecting N-channel modulated signals to orthonormal transform processing at the sending side to generate N-channel transformed signals of low cross-correlation and transmitting them over said N-channel;

(b) multiplexing said N-channel transformed signals and transmitting them;

(c) receiving said N-channel transmitted signals from said multiplexed signal at the receiving side and subjecting them to transform processing inverse to said orthonormal transform processing to obtain N-channel modulated signals; and (d) demodulating said N-channel modulated signals into said N-channel digital signals.

16. The method of claim 14 or 15, further comprising the steps of: converting, at said transmitting side, an input serial digital signal into N-channel parallel digital signals to obtain said N-channel modulated signals; and converting, at said receiving side, demodulated signals of said N-channel parallel digital signals into one serial digital signal.

17. The method of claim 14 or 15, further comprising the steps of: sequentially selecting, at said transmitting side, N-channel output signals obtained by said orthonormal transform processing, then outputting them as a serial signal and transducing said serial signal into an optical signal for transmission over an optical fiber cable; and transducing, at said receiving side, said optical signal received from said optical fiber cable into an electrical signal and sequentially distributing it into N channels to obtain said received signals of said N channels.

18. The method of claim 14 or 15, further comprising the steps of: sequentially selecting, at said transmitting side, N-channel output signals obtained by said orthonormal transform processing and serially transmitting them over a metallic cable; and sequentially distributing, at said receiving side, said serial signal received from said metallic cable into N channels to obtain received signals of said N channels.

19. The method of claim 14 or 15, wherein said orthonormal transform processing is based on a WHT base.

20. The method of claim 14 or 15, wherein said orthonormal transform processing is based on a DCT base.

21. The method of claim 14 or 15, wherein, letting the vector of an input signal into said orthonormal transform means at time t be represented by u(t), a complex base-band signal in an i-th channel by $u_i(t)$ (where i=0,1, ..., N−1), an N×N orthonormal transform matrix to be implemented by said orthonormal transform means by A, an element (i,j) of its complex number by $a_{ij}$, the vector of an orthonormal transform base by $a_i$, the vector of the output from said orthonormal transform means by v(t), and a complex output signal in said i-th channel by $v_i(t)$ and letting T represent a transposition, $u(t) = [u_0(t) u_1(t) \ldots u_{N-1}(t)]^T$ $$A = \begin{bmatrix} a_{0,0} & a_{0,1} & \cdots & a_{0,N-1} \\ a_{1,0} & a_{1,1} & \cdots & a_{1,N-1} \\ \vdots & \vdots & & \vdots \\ a_{i,0} & a_{i,1} & \cdots & a_{i,N-1} \\ \vdots & \vdots & & \vdots \\ a_{N-1,0} & a_{N-1,1} & \cdots & a_{N-1,N-1} \end{bmatrix}$$

$a_i = (a_{i0} a_{i1} \ldots a_{iN-1})$ $v(t) = [v_0(t) v_1(t) \ldots v_{N-1}(t)]^T$ $v(t) = Au(t)$ and said orthonormal transform matrix A satisfies $$\sum_{n=0}^{N-1} a_{in} a_{jn}^* = \delta_{ij}$$

where $\delta_{ij}$ is 1 when i=j and 0 when i≠j and * is a complex conjugate.

* * * * *

UNITED STATES PATENT AND TRADEMARK OFFICE
CERTIFICATE OF CORRECTION

PATENT NO. : 6,178,158 B1
DATED : January 23, 2001
INVENTOR(S) : Yasunori Suzuki et al.

It is certified that error appears in the above-identified patent and that said Letters Patent is hereby corrected as shown below:

<u>Title page,</u>
Item [73], Assignee, should read -- NTT Mobile Communications Network Inc., Toranomon 2-chome, Minato-ku, Tokyo 105 Japan --

Signed and Sealed this

Eighteenth Day of May, 2004

JON W. DUDAS
*Acting Director of the United States Patent and Trademark Office*